US00RE47824E

(19) United States
(12) Reissued Patent
Choo et al.

(10) Patent Number: US RE47,824 E
(45) Date of Reissued Patent: Jan. 21, 2020

(54) METHOD AND APPARATUS FOR ENCODING AND DECODING HIGH FREQUENCY BAND

(71) Applicant: SAMSUNG ELECTRONICS CO., LTD., Suwon-si (KR)

(72) Inventors: Ki-hyun Choo, Seoul (KR); Anton Porov, Yongin-si (KR); Eun-mi Oh, Seongnam-si (KR); Jung-hoo Kim, Seoul (KR)

(73) Assignee: SAMSUNG ELECTRONICS CO., LTD., Suwon-si (KR)

(21) Appl. No.: 14/883,356

(22) Filed: Oct. 14, 2015

Related U.S. Patent Documents

Reissue of:
(64) Patent No.: 8,560,304
Issued: Oct. 15, 2013
Appl. No.: 11/877,015
Filed: Oct. 23, 2007

(30) Foreign Application Priority Data

Apr. 30, 2007 (KR) ..... 10-2007-0042035

(51) Int. Cl.
*G10L 19/02* (2013.01)
*G10L 21/038* (2013.01)

(52) U.S. Cl.
CPC ..... *G10L 19/0204* (2013.01); *G10L 21/038* (2013.01)

(58) Field of Classification Search
CPC ..... G10L 21/038; G10L 19/0204
(Continued)

(56) References Cited

U.S. PATENT DOCUMENTS 4,956,871 A 9/1990 Swaminathan
5,040,217 A * 8/1991 Brandenburg et al. .... 704/200.1
(Continued)

FOREIGN PATENT DOCUMENTS

CN 1247415 A 3/2000
CN 1527995 A 9/2004
(Continued)

OTHER PUBLICATIONS

Per Ekstrand, Bandwidth Extension of Audio Signals by Spectral Band Replication, Proc. 1st IEEE Benelux Workshop on Model based Processing and Coding of Audio (MPCA-2002, Leuven, Belgium, Nov. 15, 2002.*

(Continued)

*Primary Examiner* — Dennis G Bonshock
(74) *Attorney, Agent, or Firm* — Sughrue Mion, PLLC

(57) ABSTRACT

Provided is a method and apparatus for encoding or decoding a signal corresponding to a high frequency band in an audio signal. The method and apparatus for encoding a high frequency band detects and encodes frequency component(s) according to a pre-set criterion from a signal corresponding to a frequency band higher than a pre-set frequency and encodes energy value(s) of a signal to reconstruct band(s) in which the detected frequency component(s) are included. The method and apparatus for decoding a high frequency band decodes the signal by adjusting a signal to reconstruct a band in which important frequency component(s) are included by considering an energy value of the important frequency component(s). Accordingly, even though encoding or decoding is performed using a small number of bits, there is no degradation in sound quality of a signal corresponding to a high frequency band, and thus coding efficiency can be maximized.

1 Claim, 15 Drawing Sheets

(58) Field of Classification Search
USPC ..... 704/205; 381/23
See application file for complete search history.

(56) References Cited

U.S. PATENT DOCUMENTS

| | | | | |
|---|---|---|---|---|
| 5,579,404 | A * | 11/1996 | Fielder et al. | 381/106 |
| 6,697,775 | B2 | 2/2004 | Kawahara | |
| 7,003,451 | B2 * | 2/2006 | Kjorling | G10L 21/038 375/240 |
| 7,050,972 | B2 | 5/2006 | Henn et al. | |
| 7,469,206 | B2 * | 12/2008 | Kjorling | G10L 19/07 704/205 |
| 8,073,050 | B2 * | 12/2011 | Suzuki | G10L 19/083 375/240.01 |
| 8,612,219 | B2 * | 12/2013 | Tsuchinaga | G10L 19/002 704/200.1 |
| RE45,042 | E | 7/2014 | Tsushima et al. | |
| 8,788,275 | B2 * | 7/2014 | Shirakawa | G10L 19/24 704/200 |
| 2002/0009000 | A1 * | 1/2002 | Goldberg et al. | 365/200 |
| 2003/0093271 | A1 | 5/2003 | Tsushima et al. | |
| 2005/0096917 | A1 * | 5/2005 | Kjorling | G10L 19/24 704/500 |
| 2005/0149339 | A1 * | 7/2005 | Tanaka | G10L 21/038 704/500 |
| 2005/0267744 | A1 | 12/2005 | Nettre et al. | |
| 2006/0013405 | A1 * | 1/2006 | Oh et al. | 381/23 |
| 2006/0020958 | A1 | 1/2006 | Allamanche et al. | |
| 2006/0031075 | A1 * | 2/2006 | Oh | G10L 21/038 704/500 |
| 2007/0016404 | A1 | 1/2007 | Kim et al. | |
| 2007/0016412 | A1 | 1/2007 | Mehrotra et al. | |
| 2008/0263285 | A1 * | 10/2008 | Sharma | G06F 9/30014 711/147 |

FOREIGN PATENT DOCUMENTS

| | | | |
|---|---|---|---|
| JP | 2123828 | A | 5/1990 |
| JP | 2003-216190 | | 7/2003 |
| JP | 2003216190 | A | 7/2003 |
| JP | 2003-255973 | | 9/2003 |
| JP | 2003255973 | A | 9/2003 |
| JP | 2004-514180 | | 5/2004 |
| JP | 2004514180 | A | 5/2004 |
| JP | 2007187905 | A | 7/2007 |
| KR | 10-0209870 | | 7/1999 |
| KR | 2007-5468 | | 1/2007 |
| KR | 2007-11100 | | 1/2007 |
| KR | 20070005468 | A | 1/2007 |
| KR | 20070011100 | A | 1/2007 |
| WO | 03/042979 | | 5/2003 |
| WO | 2003042979 | A2 | 5/2003 |
| WO | 03/046891 | | 6/2003 |
| WO | 2003046891 | A1 | 6/2003 |

OTHER PUBLICATIONS

Communication dated Jan. 14, 2014, issued by the Japanese Patent Office in counterpart Japanese Application No. 2012-263597.
Communication dated Aug. 14, 2014 issued by the State Intellectual Property Office of P.R. China in counterpart Chinese Application No. 2012110211740.0.
Communication dated Mar. 12, 2015, issued by the State Intellectual Property Office of P.R. China in counterpart Chinese Application No. 201210209575.5.
Communication dated May 29, 2018, issued by the Japanese Patent Office in counterpart Japanese Application No. 2016-237817.
International Search Report dated Jun. 10, 2008 issued in PCT/KR2008/1188.
European Search Report issued Jun. 15, 2011 in EP Application No. 08723226.0.
Painter T et al. "A review of algorithms for perceptual coding of digital audio signals" Digital Signal Processing Proceedings, 1997. Dsp. 97., 1997 13th Intern Ational Conference on Santorini, Greece Jul. 2-4, 1997, New York,NY, USA, IEEE, US vol. 1, Jul. 2, 1997, pp. 179-208, XP010251044,DOI: DOI:10.1109/ICDSP.1997.628010 ISBN: 978-0-7803-4137-1 p. 195, section IV,"Subband coders".
Ekstrand P: "Bandwidth Extension of Audio 1-15 Signals by Spectral Band Replication" IEEE Benelux Workshop on Model Based Processing and Coding of Audio,XX,XX, Nov. 15, 2002, pp. 53-58, XP000962047, p. 54, section 2., "The SBR encoder" figure 5.
Japanese Office Action issued on Jan. 10, 2012 in JP Patent Application No. 2010-506031.
Japanese Office Action Issued on Jul. 31, 2012 in JP Patent Application No. 2010-506031.
Office Action issued in JP Application No. 2010-506031 on Apr. 16, 2013.
Office Action issued in KR Application No. 2007-0042035 on Apr. 18, 2013.

* cited by examiner

METHOD AND APPARATUS FOR ENCODING AND DECODING HIGH FREQUENCY BAND

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This [application claims the benefit of] *is a reissue application of U.S. Pat. No. 8,560,304, which was filed as U.S. patent application Ser. No. 11/877,015 on Oct. 23, 2007 and issued on Oct. 15, 2013, and which claims priority from* Korean Patent Application No. 10-2007-0042035, filed on Apr. 30, 2007[,] in the Korean Intellectual Property Office, the disclosure of which is incorporated herein [in its entirety] by reference *in its entirety*.

BACKGROUND OF THE INVENTION

1. Field of the Invention

The present invention relates to a method and apparatus for encoding and decoding an audio signal, such as a voice signal or a music signal, and more particularly, to a method and apparatus for encoding and decoding a signal corresponding to a high frequency band in an audio signal.

2. Description of the Related Art

In general, a signal corresponding to a high frequency band is less important than a signal corresponding to a low frequency band in terms of a human being's perception of an audio signal as a sound. Thus, when an audio signal is encoded, if coding efficiency must be increased due to a limitation in the number of available bits, a signal corresponding to the low frequency band is encoded by allocating many bits thereto, while a signal corresponding to the high frequency band is encoded by allocating less bits thereto.

However, in some cases, the signal corresponding to the high frequency band may be important and the human being should be able to perceive an audio signal as a sound. In this case, by not exactly encoding the signal corresponding to the high frequency band, sound quality of a signal decoded by a decoder may be degraded.

SUMMARY OF THE INVENTION

The present invention provides a method and apparatus for detecting and encoding important frequency component(s) from a signal corresponding to a frequency band higher than a pre-set frequency and encoding energy value(s) of a signal to reconstruct band(s) in which the detected frequency component(s) are included.

The present invention also provides a method and apparatus for decoding a signal to reconstruct band(s) in which important frequency component(s) are included by considering energy value(s) of the important frequency component(s).

Additional aspects and utilities of the present general inventive concept will be set forth in part in the description which follows and, in part, will be obvious from the description, or may be learned by practice of the general inventive concept.

According to an aspect of the present invention, there is provided a method of encoding a high frequency band, the method comprising: detecting and encoding frequency component(s) according to a pre-set criterion from a signal corresponding to a frequency band higher than a pre-set frequency; and encoding energy value(s) of a signal to reconstruct band(s) in which the detected frequency component(s) are included.

According to another aspect of the present invention, there is provided a method of decoding a high frequency band, the method comprising: decoding frequency component(s) included in a frequency band higher than a pre-set frequency; decoding energy value(s) of a signal to reconstruct band(s) in which the decoded frequency component(s) are included; generating signal(s) that are to reconstruct the band(s); adjusting energy value(s) of the generated signal(s) considering the energy value(s) of the decoded frequency component(s) based on the decoded energy value(s); and combining the decoded frequency component(s) and the energy value-adjusted signal(s).

According to another aspect of the present invention, there is provided a method of decoding a high frequency band, the method comprising: decoding frequency component(s) included in a frequency band higher than a pre-set frequency; decoding a signal corresponding to the frequency band higher than the pre-set frequency using a signal corresponding to a frequency band lower than the pre-set frequency; adjusting an energy value of the decoded signal considering energy value(s) of the decoded frequency component(s); and combining the decoded frequency component(s) and the energy value-adjusted signal(s).

According to another aspect of the present invention, there is provided a computer readable recording medium storing a computer readable program for executing a method of encoding a high frequency band, the method comprising: detecting and encoding frequency component(s) according to a pre-set criterion from a signal corresponding to a frequency band higher than a pre-set frequency; and encoding energy value(s) of a signal to reconstruct band(s) in which the detected frequency component(s) are included.

According to another aspect of the present invention, there is provided a computer readable recording medium storing a computer readable program for executing a method of decoding a high frequency band, the method comprising: decoding frequency component(s) included in a frequency band higher than a pre-set frequency; decoding energy value(s) of a signal to reconstruct band(s) in which the decoded frequency component(s) are included; generating signal(s) that are to reconstruct the band(s); adjusting energy value(s) of the generated signal(s) considering the energy value(s) of the decoded frequency component(s) based on the decoded energy value(s); and combining the decoded frequency component(s) and the energy value-adjusted signal(s).

According to another aspect of the present invention, there is provided a computer readable recording medium storing a computer readable program for executing a method of decoding a high frequency band, the method comprising: decoding frequency component(s) included in a frequency band higher than a pre-set frequency; decoding a signal corresponding to the frequency band higher than the pre-set frequency using a signal corresponding to a frequency band lower than the pre-set frequency; adjusting an energy value of the decoded signal considering energy value(s) of the decoded frequency component(s); and combining the decoded frequency component(s) and the energy value-adjusted signal(s).

According to another aspect of the present invention, there is provided an apparatus for encoding a high frequency band, the apparatus comprising: a frequency component encoder detecting and encoding frequency component(s) according to a pre-set criterion from a signal corresponding to a frequency band higher than a pre-set frequency; and an energy value encoder encoding energy value(s) of a signal to reconstruct band(s) in which the detected frequency component(s) are included.

According to another aspect of the present invention, there is provided an apparatus for decoding a high frequency band, the apparatus comprising: a frequency component decoder decoding frequency component(s) included in a frequency band higher than a pre-set frequency; an energy value decoder decoding energy value(s) of a signal to reconstruct band(s) in which the decoded frequency component(s) are included; a signal generator generating signal(s) that are to reconstruct the band(s); a signal adjuster adjusting energy value(s) of the generated signal(s) considering the energy value(s) of the decoded frequency component(s) based on the decoded energy value(s); and a signal combiner combining the decoded frequency component(s) and the energy value-adjusted signal(s).

According to another aspect of the present invention, there is provided an apparatus for decoding a high frequency band, the apparatus comprising: a frequency component decoder decoding frequency component(s) included in a frequency band higher than a pre-set frequency; a bandwidth expansion decoder decoding a signal corresponding to the frequency band higher than the pre-set frequency using a signal corresponding to a frequency band lower than the pre-set frequency; a signal adjuster adjusting an energy value of the decoded signal considering energy value(s) of the decoded frequency component(s); and a signal combiner combining the decoded frequency component(s) and the energy value-adjusted signal(s).

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
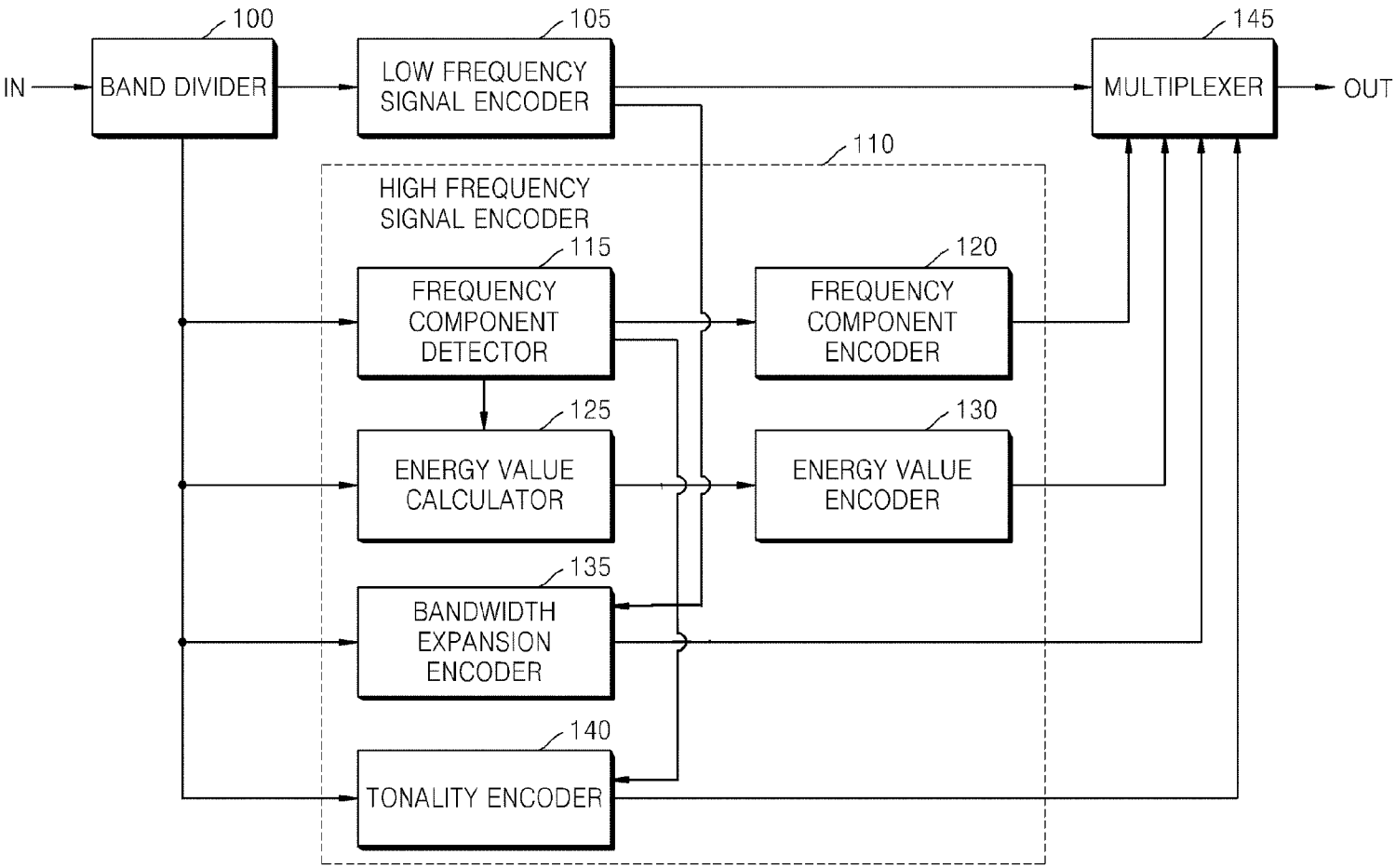
FIG. 1 is a block diagram of an encoding apparatus according to an embodiment of the present invention.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram of an encoding apparatus according to an embodiment of the present invention. Referring to FIG. 1, the encoding apparatus includes a band divider 100, a low frequency signal encoder 105, a high frequency signal encoder 110, and a multiplexer 145.

The band divider 100 divides a signal input through an input terminal IN into a low frequency signal and a high frequency signal based on a pre-set frequency. The low frequency signal corresponds to a frequency band lower than a pre-set first frequency, and the high frequency signal corresponds to a frequency band higher than a pre-set second frequency. The first frequency and the second frequency may be, but are not necessarily, set to be the same value.

The low frequency signal encoder 105 encodes the low frequency signal divided by the band divider 100 using a pre-set encoding method. The low frequency signal encoder 105 can perform the encoding by using any disclosed encoding method. That is, since the encoding apparatus according to the current embodiment is characterized by the encoding of the high frequency signal, encoding the low frequency signal is not limited to a specific encoding method. Examples of the encoding method used in the low frequency signal encoder 105 are an Advanced Audio Coding (AAC) method, a method of detecting and encoding only important frequency component(s) from an input signal and encoding the remaining frequency components as a predetermined noise signal, and so on.

The high frequency signal encoder 110 detects and encodes important frequency component(s) from the high frequency signal divided by the band divider 100, calculates and encodes energy value(s) of signal(s) that reconstruct the band(s) from which the important frequency component(s) are detected, and encodes a high frequency signal to reconstruct the band(s) from which the important frequency component(s) are not detected using the low frequency signal. The high frequency signal encoder 110 includes a frequency component detector 115, a frequency component encoder 120, an energy value calculator 125, an energy value encoder 130, a bandwidth expansion encoder 135, and a tonality encoder 140.

The frequency component detector 115 detects frequency component(s) determined as important frequency(s) component according to a pre-set criterion from the high frequency signal divided by the band divider 100. Methods used by the frequency component detector 115 to determine an important frequency component will now be described. As a first method, a Signal to Masking Ratio (SMR) value is calculated, and a signal component greater than a masking threshold is selected as an important frequency component. As a second method, an important frequency component is selected by extracting a spectral peak considering a predetermined weight. As a third method, a Signal to Noise Ratio (SNR) value is calculated for each sub-band, and a frequency component having a peak value greater than a predetermined value in each sub-band having a low SNR value is selected as an important frequency component. The three methods described above can be separately embodied or can be embodied by combining one with another. In addition, these three methods are only illustrations, and the present invention is not limited thereto.

The frequency component encoder 120 encodes the frequency component(s) detected by the frequency component detector 115 and information indicating position(s) at which the frequency component(s) are prepared.

The energy value calculator 125 calculates an energy value of each signal to reconstruct band(s) in which the frequency component(s) detected by the frequency component detector 115 are included. A band is a processing unit applied for the bandwidth expansion encoder 135 to perform encoding. For example, in the case of a Quadrature Mirror Filter (QMF), a band can be a sub-band or a scale factor band.

The energy value encoder 130 encodes an energy value of each band, which is calculated by the energy value calculator 125, and information indicating a position of each band.

The bandwidth expansion encoder 135 encodes signal(s) to reconstruct band(s) in which the frequency component(s) detected by the frequency component detector 115 are not included using the low frequency signal. When the bandwidth expansion encoder 135 encodes a signal, the bandwidth expansion encoder 135 generates and encodes information for decoding the high frequency signal using the low frequency signal.

The tonality encoder 140 calculates and encodes each tonality of high frequency signal(s) to reconstruct the band(s) in which the frequency component(s) detected by the frequency component detector 115 are included. However, in the current embodiment, the tonality encoder 140 does not have to be necessarily included. That is, when a decoder (not shown) generates a signal to reconstruct the band(s) in which frequency component(s) are included, if the decoder generates a single signal using a plurality of signals instead of using a single signal, the tonality encoder 140 may be necessary. For example, when the decoder generates signal(s) that reconstruct band(s) in which frequency component(s) are included using both an arbitrarily generated signal and a patched signal, the tonality encoder 140 is necessary.

The multiplexer 145 multiplexes the result of the encoding performed by the low frequency signal encoder 105, the frequency component(s) and the information indicating position(s) at which the frequency component(s) are to be reconstructed at the decoder, which are encoded by the frequency component encoder 120, the energy value of each band and the information indicating a position of each band, which are encoded by the energy value encoder 130, and the information for decoding the high frequency signal using the low frequency signal, which is encoded by the bandwidth expansion encoder 135 and outputs a multiplexed bitstream via an output terminal OUT. In some cases, the multiplexer 145 can multiplex the data described above and the tonality(-ies) encoded by the tonality encoder 140.

Figure 2:
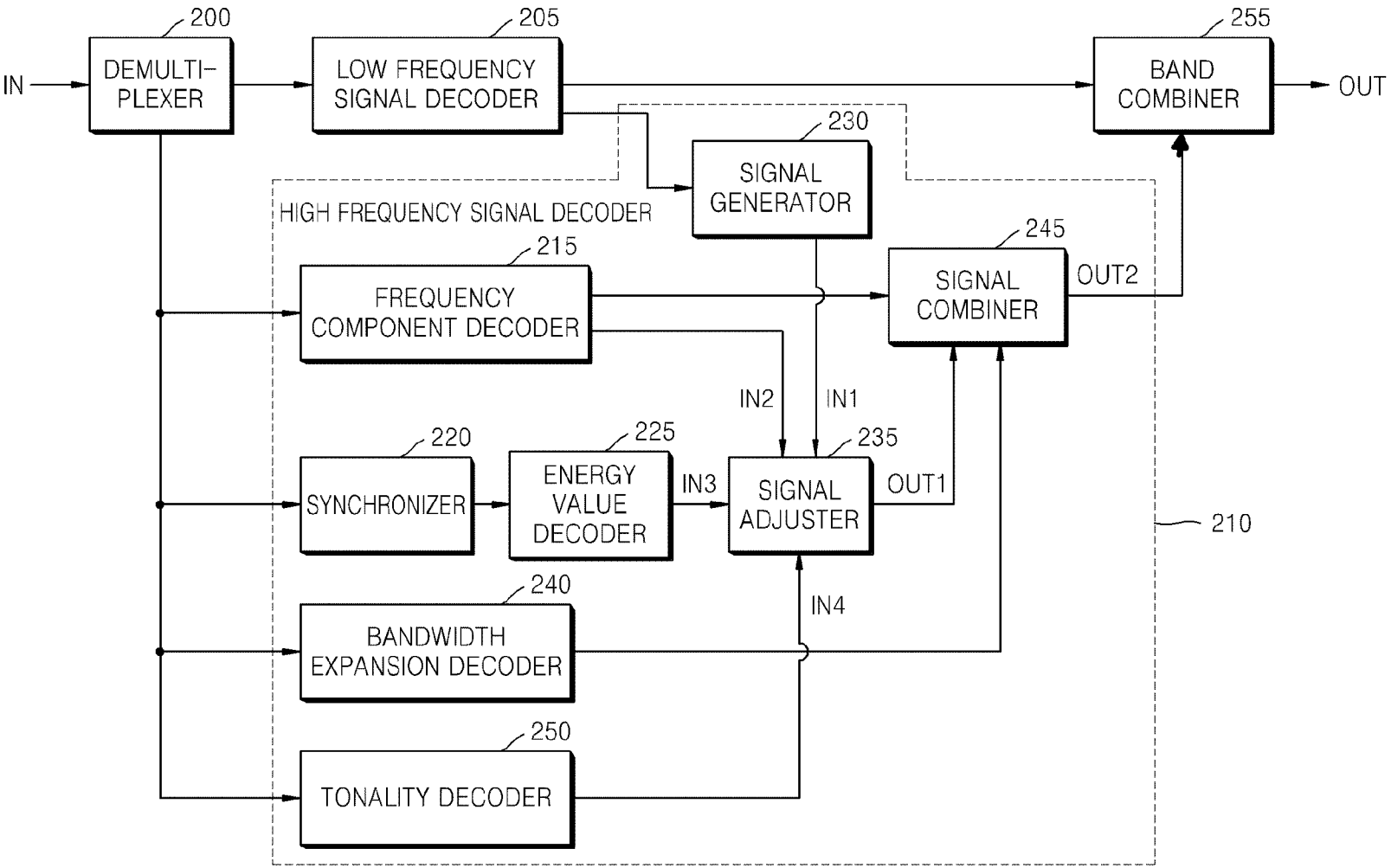
FIG. 2 is a block diagram of a decoding apparatus according to an embodiment of the present invention.

FIG. 2 is a block diagram of a decoding apparatus according to an embodiment of the present invention. Referring to FIG. 2, the decoding apparatus includes a demultiplexer 200, a low frequency signal decoder 205, a high frequency signal decoder 210, and a band combiner 255.

The demultiplexer 200 receives a bitstream from an encoder (not shown) via an input terminal IN and demultiplexer the bitstream. For example, the demultiplexer 200 can demultiplex the bitstream to frequency component(s) and information indicating position(s) at which the frequency component(s) are to be reconstructed, an energy value of each band, and a position of each band in which an energy value is encoded by the encoder, information for decoding a high frequency signal using a low frequency signal, and tonality(-ies). The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal decoder 205 decodes the low frequency signal using a pre-set decoding method. The low frequency signal decoder 205 can perform the decoding by using any disclosed decoding method. That is, since the decoding apparatus according to the current embodiment is characterized by the decoding of the high frequency signal, decoding the low frequency signal is not limited to a specific decoding method. Examples of the decoding method used in the low frequency signal decoder 205 are the AAC method, a method of decoding predetermined important frequency component(s) and decoding the remaining frequency components as a predetermined noise signal, and so on.

The high frequency signal decoder 210 decodes frequency component(s) encoded by detecting important frequency component(s) from the high frequency signal in the encoder. In the case of band(s) in which an important frequency component is included, the high frequency signal decoder 210 decodes energy value(s) of a signal to reconstruct the band(s) in which the frequency component is included and decodes a high frequency signal of the band(s) in which the frequency component is included by using the decoded energy value(s). In the case of band(s) in which an important frequency component is not included, the high frequency signal decoder 210 decodes the high frequency signal using the low frequency signal. The high frequency signal decoder 210 includes a frequency component decoder 215, a synchronizer 220, an energy value decoder 225, a signal generator 230, a signal adjuster 235, a bandwidth expansion decoder 240, a signal combiner 245, and a tonality decoder 250.

The frequency component decoder 215 decodes predetermined frequency component(s) determined as important frequency component(s) according to a pre-set criterion and encoded by the encoder.

The synchronizer 220 synchronizes a frame applied to the frequency component decoder 215 and a frame applied to the bandwidth expansion decoder 240 if the frame applied to the frequency component decoder 215 does not match the frame applied to the bandwidth expansion decoder 240. The synchronizer 220 may process a portion of or an entire frame applied to the bandwidth expansion decoder 240 based on the frame applied to the frequency component decoder 215.

The energy value decoder 225 decodes energy value(s) of a signal to reconstruct band(s) in which the frequency component(s) decoded by the frequency component decoder 215 are included.

The signal generator 230 generates signal(s) that are to reconstruct the band(s) in which the frequency component(s) decoded by the frequency component decoder 215 are included.

Examples of a method used by the signal generator 230 to generate a signal will now be described. As a first method, the signal generator 230 generates an arbitrary high frequency signal, e.g. a random noise signal. As a second method, the signal generator 230 can generate a high frequency signal by copying, e.g. patching or folding, the low frequency signal decoded by the low frequency signal decoder 205. As a third method, the signal generator 230 can generate a high frequency signal using a low frequency signal.

The signal adjuster 235 adjusts the signal generated by the signal generator 230 so that energy of the signal generated by the signal generator 230 is adjusted considering energy value(s) of the frequency component(s) decoded by the frequency component decoder 215 based on an energy value of each band, which is decoded by the energy value decoder 225. The signal adjuster 235 will be described in more detail later with reference to FIG. 3.

The bandwidth expansion decoder 240 decodes a signal to reconstruct band(s) in which the frequency component(s) decoded by the frequency component decoder 215 are not included in the high frequency signal using the low frequency signal decoded by the low frequency signal decoder 205.

The signal combiner 245 combines the frequency component(s) decoded by the frequency component decoder 215 and the signal adjusted by the signal adjuster 235. Since the signal combined by the signal combiner 245 reconstructs only the band(s) in which the frequency component(s) decoded by the frequency component decoder 215 are included, the signal combiner 245 further combines the signal decoded by the bandwidth expansion decoder 240 for the remaining band(s). As described above, the signal combiner 245 finally generates a high frequency signal by combining the signals.

The tonality decoder 250 decodes tonality(-ies) of signal(s) prepared to the band(s) in which the frequency component(s) decoded by the frequency component decoder 215 are included. However, in the current embodiment, the tonality decoder 250 does not have to be necessarily included. That is, when the signal generator 230 generates a single signal using a plurality of signals instead of using a single signal, the tonality decoder 250 may be necessary. For example, when the signal generator 230 generates signal(s) to reconstruct the band(s) in which the frequency component(s) decoded by the frequency component decoder 215 are included using both an arbitrarily generated signal and a patched signal, the tonality decoder 250 is necessary. If the tonality decoder 250 is included in the current embodiment, the signal adjuster 235 adjusts the signal generated by the signal generator 230 by further considering the tonality(-ies) decoded by the tonality decoder 250.

The band combiner 255 combines the low frequency signal decoded by the low frequency signal decoder 205 and the high frequency signal combined by the signal combiner 245 and outputs the combined signal via an output terminal OUT.

Figure 3:
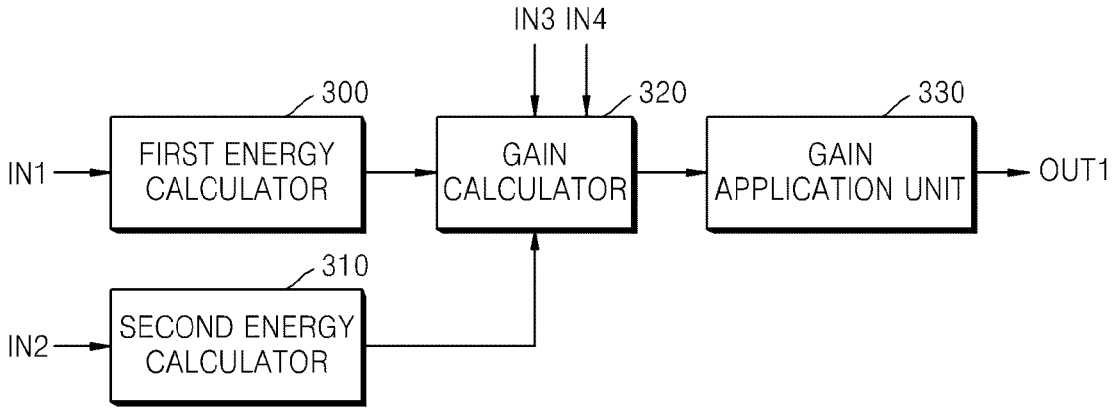
FIG. 3 is a block diagram of a signal adjuster included in the decoding apparatus illustrated in FIG. 2, according to an embodiment of the present invention.

FIG. 3 is a block diagram of the signal adjuster 235 included in the decoding apparatus illustrated in FIG. 2, according to an embodiment of the present invention. The signal adjuster 235 illustrated in FIG. 3 includes a first energy calculator 300, a second energy calculator 310, a gain calculator 320, and a gain application unit 330. The signal adjuster 235 illustrated in FIG. 3 will now be described with reference to FIG. 2.

The first energy calculator 300 calculates an energy value of a signal to reconstruct each band by receiving the signal(s), which are generated by the signal generator 230 with respect to the band(s) in which the frequency component(s) are included, via an input terminal IN1.

The second energy calculator 310 calculates an energy value of each frequency component by receiving the frequency component(s) decoded by the frequency component decoder 215 via an input terminal IN2.

The gain calculator 320 receives the energy value(s) of the band(s) in which the frequency component(s) are included from the energy value decoder 225 via an input terminal IN3 and calculates a gain value so that each energy value calculated by the first energy calculator 300 becomes a value obtained by subtracting each energy value calculated by the second energy calculator 310 from each energy value received from the energy value decoder 225. For example, the gain calculator 320 can calculate the gain value by using Equation 1.

$$g = \sqrt{\frac{E_{target} - E_{core}}{E_{seed}}} \tag{1}$$

In Equation 1, $E_{target}$ denotes each energy value received from the energy value decoder 225, $E_{core}$ denotes each energy value calculated by the second energy calculator 310, and $E_{seed}$ denotes each energy value calculated by the first energy calculator 300.

If the gain calculator 320 calculates the gain value considering the tonality, the gain calculator 320 receives the energy value(s) of the band(s) in which the frequency component(s) are included from the energy value decoder 225 via the input terminal IN3, receives the tonality(-ies) of the signal(s) prepared to the band(s) in which the frequency component(s) are included from the tonality decoder 250 via an input terminal IN4, and calculates gain value(s) by using each received energy value, each received tonality, and each energy value calculated by the second energy calculator 310.

The gain application unit 330 applies the gain value for each band, which is calculated by the gain calculator 320, to a signal, which is generated by the signal generator 230 with respect to each band in which the frequency component(s) are included, received via the input terminal IN1.

Figure 4:
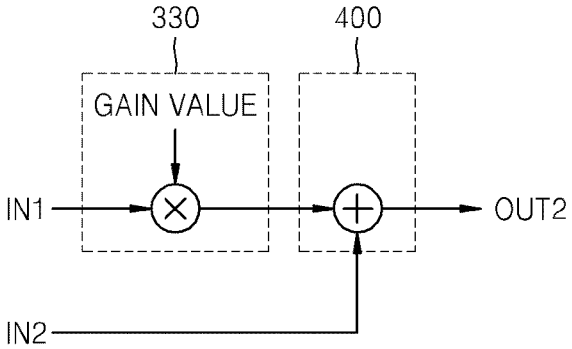
FIG. 4 illustrates a gain value applied when a signal is generated by a signal generator illustrated in FIG. 2 using only a single signal, according to an embodiment of the present invention.

FIG. 4 illustrates a gain value applied when a signal is generated by the signal generator 230 illustrated in FIG. 2 using only a single signal, according to an embodiment of the present invention.

Referring to FIG. 4, the gain application unit 330 receives the signal(s), which are generated by the signal generator 230 with respect to the band(s) in which the frequency component(s) are included, via the input terminal IN1 and multiplies the signal(s) by the gain value calculated by the gain calculator 320.

A first signal combiner 400 receives the frequency component(s) decoded by the frequency component decoder 215 via the input terminal IN2 and combines the frequency component(s) and the signal(s) gain-multiplied by the gain application unit 330. The first signal combiner 400 is a component included in the signal combiner 245 illustrated in FIG. 2.

Figure 5:
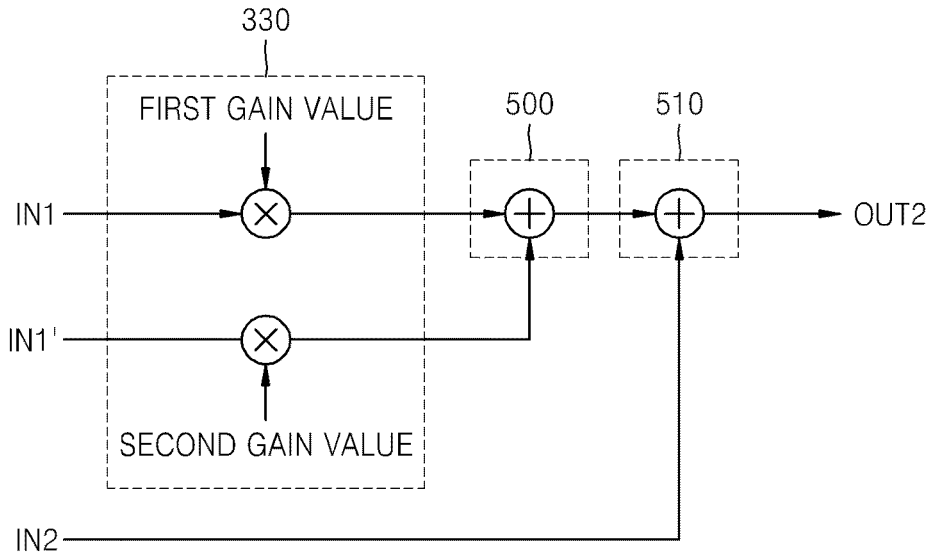
FIG. 5 illustrates gain values applied when a signal is generated by the signal generator illustrated in FIG. 2 using a plurality of signals, according to an embodiment of the present invention.

FIG. 5 illustrates gain values applied when a signal is generated by the signal generator 230 illustrated in FIG. 2 using a plurality of signals, according to an embodiment of the present invention.

Referring to FIG. 5, the gain application unit 330 receives the signal arbitrarily generated by the signal generator 230 via the input terminal IN1 and multiplies the signal by a first gain value calculated by the gain calculator 320.

The gain application unit 330 also receives the signal generated by copying the low frequency signal decoded by the low frequency signal decoder 205 or the signal generated by using the low frequency signal from the signal generator 230 via the input terminal IN1' and multiplies the signal by a second gain value calculated by the gain calculator 320.

A second signal combiner 500 combines the signal, which is first-gain-value-multiplied by the gain application unit 330, and the signal, which is second-gain-value-multiplied by the gain application unit 330.

A third signal combiner 510 receives the frequency component(s) decoded by the frequency component decoder 215 via the input terminal IN2 and combines the frequency component(s) and the signal combined by the second signal combiner 500. The third signal combiner 510 is a component included in the signal combiner 245 illustrated in FIG. 2.

Figure 6:
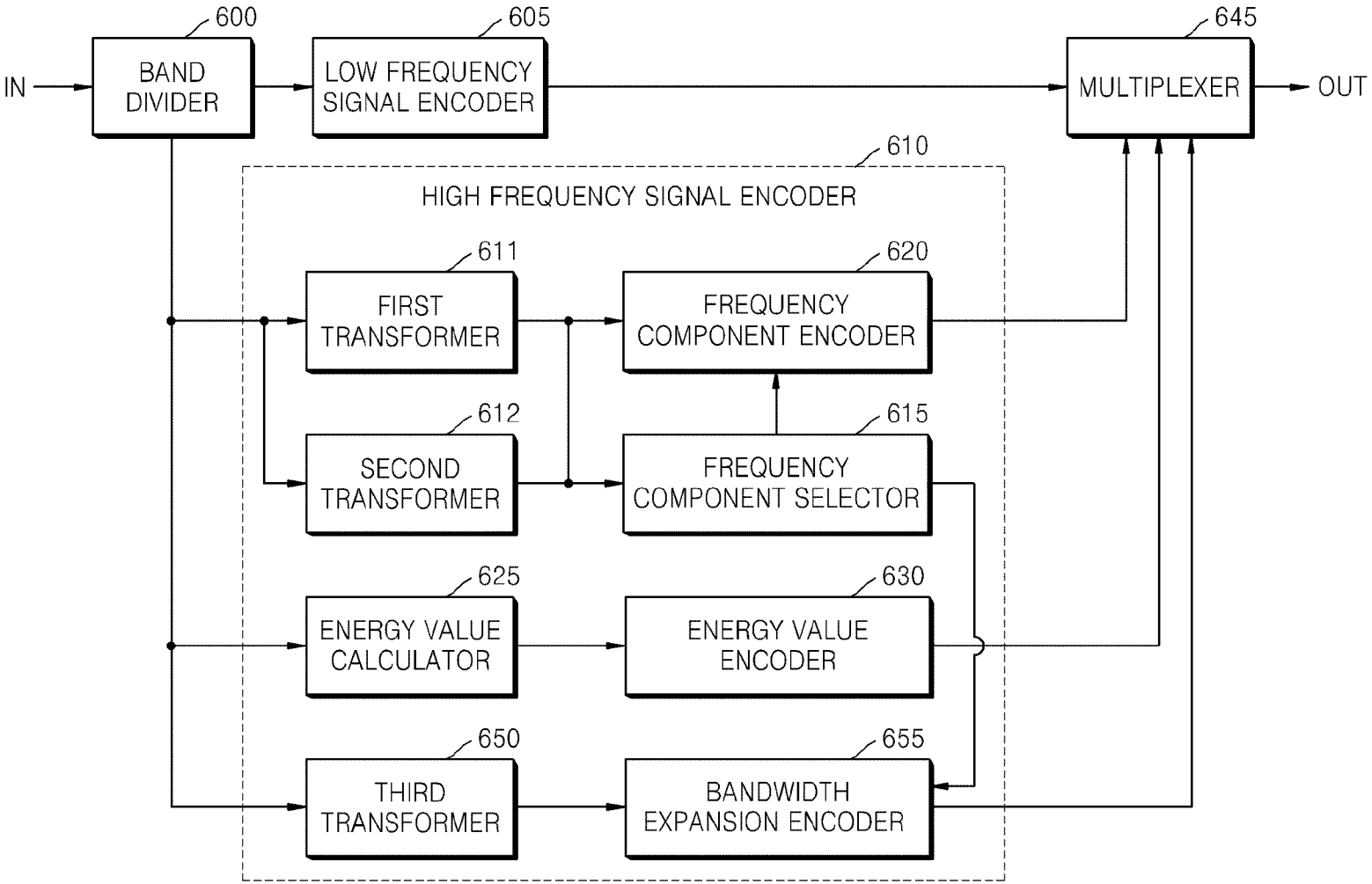
FIG. 6 is a block diagram of an encoding apparatus according to another embodiment of the present invention.

FIG. 6 is a block diagram of an encoding apparatus according to another embodiment of the present invention. Referring to FIG. 6, the encoding apparatus includes a band divider 600, a low frequency signal encoder 605, a high frequency signal encoder 610, and a multiplexer 645.

The band divider 600 divides a signal input through an input terminal IN into a low frequency signal and a high frequency signal based on a pre-set frequency. The low frequency signal corresponds to a frequency band lower than the pre-set first frequency, and the high frequency signal corresponds to a frequency band higher than the pre-set second frequency. The first frequency and the second frequency may be, but is not necessarily, set to be the same value.

The low frequency signal encoder 605 encodes the low frequency signal divided by the band divider 600 using a pre-set encoding method. The low frequency signal encoder 605 can perform the encoding by using any disclosed encoding method. That is, since the encoding apparatus according to the current embodiment is characterized by the encoding of the high frequency signal, encoding the low frequency signal is not limited to a specific encoding method. Examples of the encoding method used in the low frequency signal encoder 605 are the AAC method, the method of detecting and encoding only important frequency component(s) from an input signal and encoding the remaining frequency components as a predetermined noise signal, and so on.

The high frequency signal encoder 610 detects and encodes important frequency component(s) from the high frequency signal divided by the band divider 600, calculates and encodes energy value(s) of signal(s) to reconstruct band(s) from which the important frequency component(s) are detected, and encodes an envelope of a signal to reconstruct band(s) from which the important frequency component(s) are not detected. The high frequency signal encoder 610 includes a first transformer 611, a second transformer 612, a frequency component selector 615, a frequency component encoder 620, an energy value calculator 625, an energy value encoder 630, a third transformer 650, and a bandwidth expansion encoder 635.

The first transformer 611 transforms the high frequency signal divided by the band divider 600 in the time domain to a signal in the frequency domain using a first transformation method.

The second transformer 612 transforms the high frequency signal divided by the band divider 600 in the time domain to a signal in the frequency domain using a second transformation method, which is different from the first transformation method, in order to apply a psychoacoustic model.

The signal transformed by the first transformer 611 is used to encode the high frequency signal, and the signal transformed by the second transformer 612 is used to select an important frequency component by applying the psychoacoustic model to the high frequency signal. The psychoacoustic model is a mathematical model of a masking operation of a human auditory system.

For example, the first transformer 611 can express the high frequency signal as a real number part by transforming the high frequency signal in the time domain to a signal in the frequency domain using a Modified Discrete Cosine Transform (MDCT) method corresponding to the first transformation method, and the second transformer 612 can express the high frequency signal as an imaginary number part by transforming the high frequency signal in the time domain to a signal in the frequency domain using a Modified Discrete Sine Transform (MDST) method corresponding to the second transformation method. The signal transformed by the MDCT method and expressed as the imaginary number part is used to encode the high frequency signal, and the signal transformed by the MDST method and expressed as the real number part is used to select an important frequency component by applying the psychoacoustic model to the high frequency signal. Since signal phase information can be additionally expressed using the transformation, a miss match occurring by performing Discrete Fourier Transform (DTF) of a signal corresponding to the time domain and quantizing an MDCT coefficient can be solved.

The frequency component selector 615 selects frequency component(s) determined as important frequency component(s) using the signal transformed by the second transformer 612 according to a criterion pre-set from the signal transformed by the first transformer 611. Methods used by the frequency component selector 615 to determine an important frequency component will now be described. As a first method, an SMR value is calculated, and a signal component greater than a masking threshold is selected as an important frequency component. As a second method, an important frequency component is selected by extracting a spectral peak considering a predetermined weight. As a third method, an SNR value is calculated for each sub-band, and a frequency component having a peak value greater than a predetermined value in each sub-band having a low SNR value is selected as an important frequency component. The three methods described above can be separately embodied or can be embodied by combining one with another. In addition, these three methods are only illustrations, and the present invention is not limited thereto.

The frequency component encoder 620 encodes the frequency component(s) of a signal transformed by the first transformer 611, which are selected by the frequency component selector 615, and information indicating position(s) at which the frequency component(s) are prepared.

The energy value calculator 625 calculates an energy value of each signal prepared to band(s) in which the frequency component(s) selected by the frequency component selector 615 are included. The band is a processing unit applied for the bandwidth expansion encoder 655 to perform encoding. For example, in the case of a QMF, a band can be a sub-band or a scale factor band.

The energy value encoder 630 encodes an energy value of each band, which is calculated by the energy value calculator 625, and information indicating a position of each band.

The third transformer 650 transforms between domains so that the high frequency signal divided by the band divider 600 appears in the time domain for each predetermined frequency band using an analysis filterbank. For example, the third transformer 650 transforms between domains by applying the QMF.

The bandwidth expansion encoder 655 encodes high frequency signal(s) prepared to band(s), in which the frequency component(s) selected by the frequency component selector 615 are not included, using the low frequency signal. When the bandwidth expansion encoder 655 encodes a signal, the bandwidth expansion encoder 655 generates and encodes information for decoding the high frequency signal using the low frequency signal.

The multiplexer 645 multiplexes the result of the encoding performed by the low frequency signal encoder 605, the frequency component(s) and the information indicating position(s) at which the frequency component(s) are to be reconstructed which are encoded by the frequency component encoder 620, the energy value of each band and the information indicating a position of each band, which are encoded by the energy value encoder 630, and the information for decoding the high frequency signal using the low frequency signal, which is encoded by the bandwidth expansion encoder 655 and outputs a multiplexed bitstream via an output terminal OUT.

Figure 7:
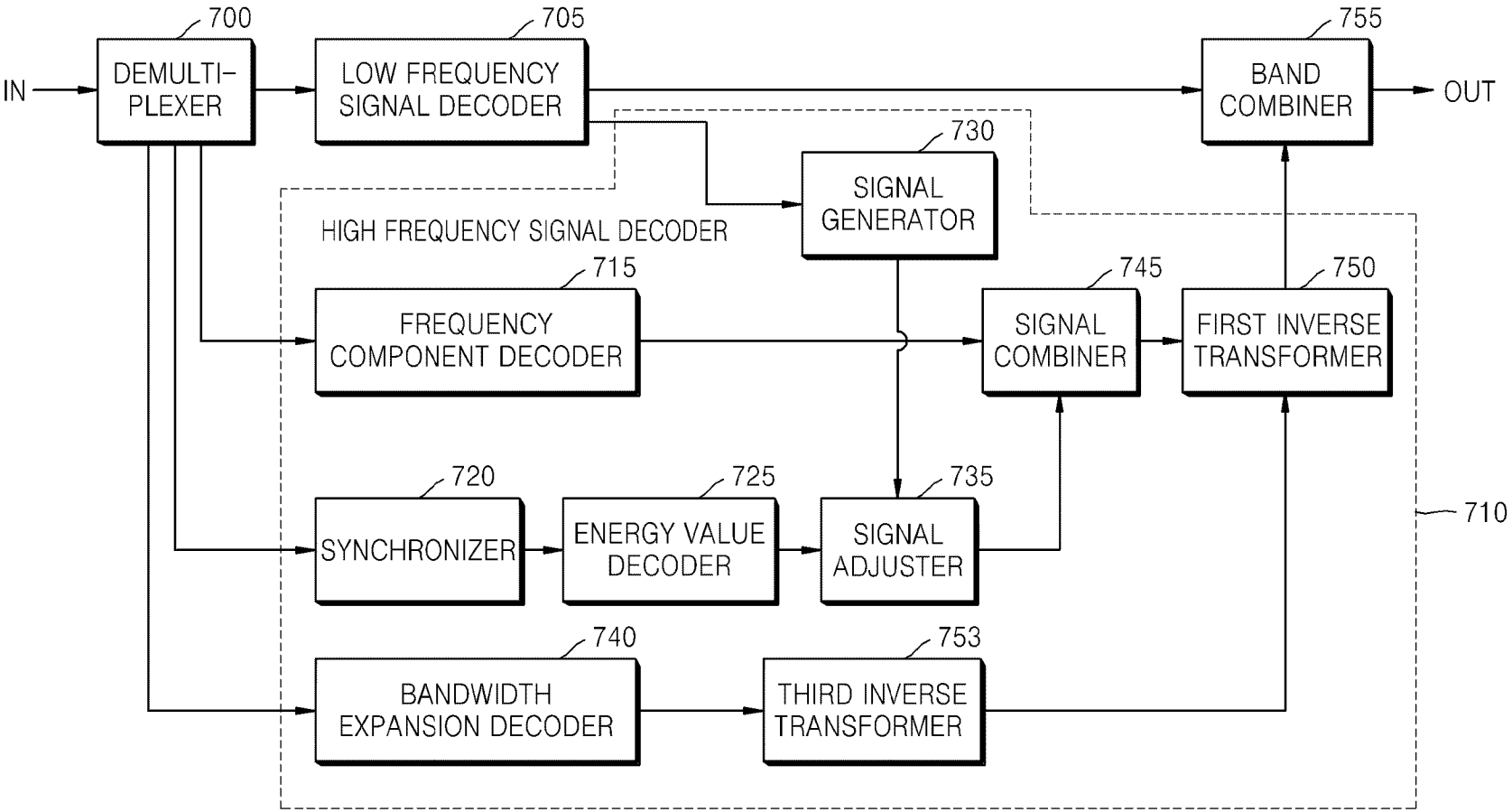
FIG. 7 is a block diagram of a decoding apparatus according to another embodiment of the present invention.

FIG. 7 is a block diagram of a decoding apparatus according to another embodiment of the present invention. Referring to FIG. 7, the decoding apparatus includes a demultiplexer 700, a low frequency signal decoder 705, a high frequency signal decoder 710, and a band combiner 755.

The demultiplexer 700 receives a bitstream from an encoder (not shown) via an input terminal IN and demultiplexes the bitstream. For example, the demultiplexer 700 can demultiplex the bitstream to frequency component(s) and information indicating position(s) at which the frequency component(s) are to be reconstructed, an energy value of each band, and a position of each band in which an energy value is encoded by the encoder, and information for decoding a high frequency signal using a low frequency signal. The low frequency signal corresponds to a frequency band lower than the pre-set first frequency, and the high frequency signal corresponds to a frequency band higher than the pre-set second frequency. The first frequency and the second frequency may be, but is not necessarily, set to be the same value.

The low frequency signal decoder 705 decodes the low frequency signal using a pre-set decoding method. The low frequency signal decoder 705 can perform the decoding by using any disclosed decoding method. That is, since the decoding apparatus according to the current embodiment is characterized by the decoding of the high frequency signal, decoding the low frequency signal is not limited to a specific decoding method. Examples of the decoding method used in the low frequency signal decoder 705 are the AAC method, the method of decoding predetermined important frequency component(s) and decoding the remaining frequency components as a predetermined noise signal, and so on.

The high frequency signal decoder 710 decodes important frequency component(s) in the high frequency signal, energy value(s) of a signal to reconstruct the band(s) in which an important frequency component is included, and the high frequency signal using the low frequency signal. The high frequency signal decoder 710 includes a frequency component decoder 715, a synchronizer 720, an energy value decoder 725, a signal generator 730, a signal adjuster 735, a bandwidth expansion decoder 740, a signal combiner 745, a first inverse transformer 750, and a third inverse transformer 753.

The frequency component decoder 715 decodes predetermined frequency component(s) determined as important frequency component(s) according to a pre-set criterion and encoded by the encoder.

The first inverse transformer 750 inverse transforms the frequency component(s) decoded by the frequency component decoder 715 from the frequency domain to the time domain in an inverse process of the transformation performed by the first transformer 611 illustrated in FIG. 6.

The synchronizer 720 synchronizes a frame applied to the frequency component decoder 715 and a frame applied to the bandwidth expansion decoder 740 if the frame applied to the frequency component decoder 715 does not match the frame applied to the bandwidth expansion decoder 740. The synchronizer 720 may process a portion of or an entire frame applied to the bandwidth expansion decoder 740 based on the frame applied to the frequency component decoder 715.

The energy value decoder 725 decodes energy value(s) of a signal to reconstruct band(s) in which the frequency component(s) decoded by the frequency component decoder 715 are included.

The signal generator 730 generates signal(s) that are to be prepared to the band(s) in which the frequency component(s) decoded by the frequency component decoder 715 are included.

Examples of a method used by the signal generator 730 to generate a signal will now be described. As a first method, the signal generator 730 generates an arbitrary high frequency signal, e.g. a random noise signal. As a second method, the signal generator 730 can generate a high frequency signal by copying, e.g. patching or folding, the low frequency signal decoded by the low frequency signal decoder 705. As a third method, the signal generator 730 can generate a high frequency signal using a low frequency signal.

The signal adjuster 735 adjusts the signal generated by the signal generator 730 so that energy of the signal generated by the signal generator 730 is adjusted considering energy value(s) of the frequency component(s) decoded by the frequency component decoder 715 based on an energy value of each band, which is decoded by the energy value decoder 725. The signal adjuster 735 has been described in more detail with reference to FIG. 3.

The bandwidth expansion decoder 740 decodes a signal to reconstruct band(s) in which the frequency component(s) decoded by the frequency component decoder 715 are not included from the high frequency signal using the low frequency signal decoded by the low frequency signal decoder 705.

The third inverse transformer 753 performs an inverse process of the transformation performed by the third transformer 650 illustrated in FIG. 6 and inverse transforms a domain of the signal decoded by the bandwidth expansion decoder 740 using a synthesis filterbank.

The signal combiner 745 combines the frequency component(s) inversely transformed by the first inverse transformer 750 and the signal adjusted by the signal adjuster 735. Since the signal combined by the signal combiner 745 reconstructs only the band(s) in which the frequency component(s) inversely transformed by the first inverse transformer 750 are included, the signal combiner 745 further combines the signal decoded by the bandwidth expansion decoder 740 and inversely transformed by the third inverse transformer 753 for the remaining band(s). As described above, the signal combiner 745 finally generates a high frequency signal by combining the signals.

The band combiner 755 combines the low frequency signal decoded by the low frequency signal decoder 705 and the high frequency signal combined by the signal combiner 745 and outputs the combined signal via an output terminal OUT.

Figure 8:
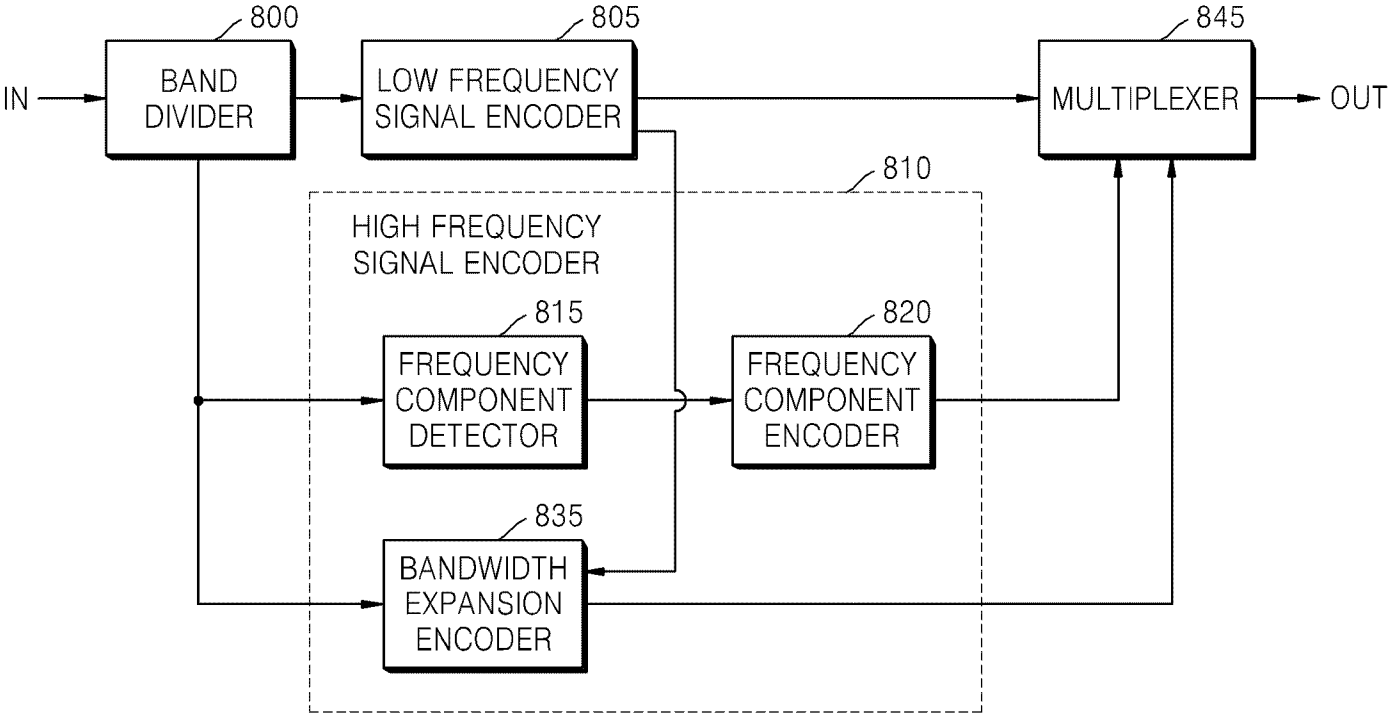
FIG. 8 is a block diagram of an encoding apparatus according to another embodiment of the present invention.

FIG. 8 is a block diagram of an encoding apparatus according to another embodiment of the present invention. Referring to FIG. 8, the encoding apparatus includes a band divider 800, a low frequency signal encoder 805, a high frequency signal encoder 810, and a multiplexer 845.

The band divider 800 divides a signal input through an input terminal IN into a low frequency signal and a high frequency signal based on a pre-set frequency. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal encoder 805 encodes the low frequency signal divided by the band divider 800 using a pre-set encoding method. The low frequency signal encoder 805 can perform the encoding by using any disclosed encoding method. That is, since the encoding apparatus according to the current embodiment is characterized by the encoding of the high frequency signal, encoding the low frequency signal is not limited to a specific encoding method. Examples of the encoding method used in the low frequency signal encoder 805 are the AAC method, the method of detecting and encoding only important frequency component(s) from an input signal and encoding the remaining frequency components as a predetermined noise signal, and so on.

The high frequency signal encoder 810 detects and encodes important frequency component(s) from the high frequency signal divided by the band divider 800 and encodes the high frequency signal using the low frequency signal. The high frequency signal encoder 810 includes a frequency component detector 815, a frequency component encoder 820, and a bandwidth expansion encoder 835.

The frequency component detector 815 detects frequency component(s) determined as important frequency component(s) according to a pre-set criterion from the high frequency signal divided by the band divider 800. Methods used by the frequency component detector 815 to determine an important frequency component will now be described. As a first method, an SMR value is calculated, and a signal component greater than a masking threshold is selected as an important frequency component. As a second method, an important frequency component is selected by extracting a spectral peak considering a predetermined weight. As a third method, an SNR value is calculated for each sub-band, and a frequency component having a peak value greater than a predetermined value in each sub-band having a low SNR value is selected as an important frequency component. The three methods described above can be separately embodied or can be embodied by combining at least one of them. In addition, these three methods are only illustrations, and the present invention is not limited thereto.

The frequency component encoder 820 encodes the frequency component(s) detected by the frequency component detector 815 and information indicating position(s) at which the frequency component(s) are prepared.

The bandwidth expansion encoder 835 encodes the high frequency signal using the low frequency signal. When the bandwidth expansion encoder 835 encodes a signal, the bandwidth expansion encoder 835 generates and encodes information for decoding the high frequency signal using the low frequency signal.

Unlike the bandwidth expansion encoder 135 illustrated in FIG. 1 or the bandwidth expansion encoder 655 illustrated in FIG. 6 in which the high frequency signal is divided into bands and only band(s) in which an important frequency component is not included are encoded, the bandwidth expansion encoder 835 encodes all of the high frequency signal using the low frequency signal.

The multiplexer 845 multiplexes the result of the encoding performed by the low frequency signal encoder 805, the frequency component(s) and the information indicating position(s) at which the frequency component(s) are prepared, which are encoded by the frequency component encoder 820, and the information for decoding the high frequency signal using the low frequency signal, which is encoded by the bandwidth expansion encoder 835 and outputs a multiplexed bitstream via an output terminal OUT.

Figure 9:
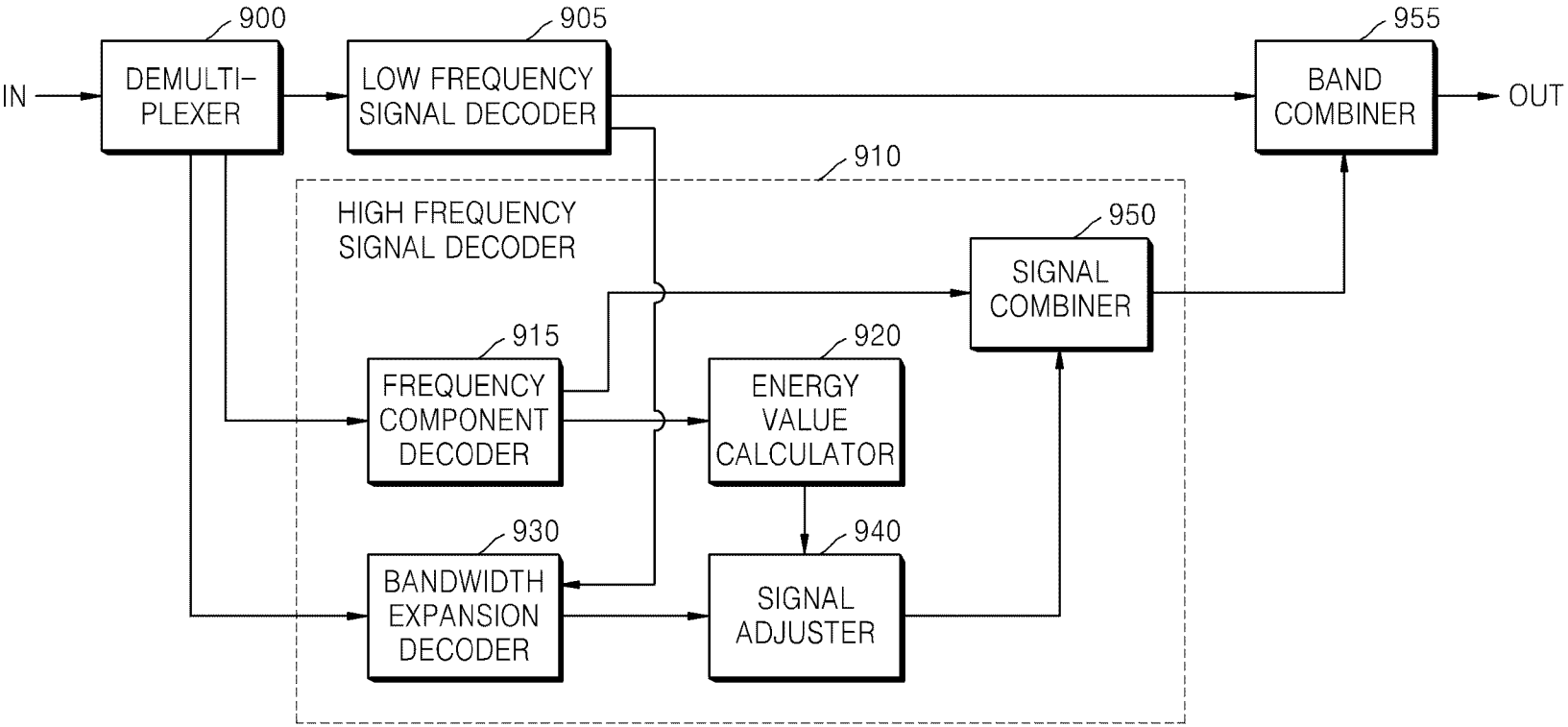
FIG. 9 is a block diagram of a decoding apparatus according to another embodiment of the present invention.

FIG. 9 is a block diagram of a decoding apparatus according to another embodiment of the present invention. Referring to FIG. 9, the decoding apparatus includes a demultiplexer 900, a low frequency signal decoder 905, a high frequency signal decoder 910, and a band combiner 955.

The demultiplexer 900 receives a bitstream from an encoder (not shown) via an input terminal IN and demultiplexes the bitstream. For example, the demultiplexer 900 can demultiplex the bitstream to frequency component(s) and information indicating position(s) at which the frequency component(s) are prepared and information for decoding a high frequency signal using a low frequency signal. The low frequency signal corresponds to a frequency band lower than the pre-set first frequency, and the high frequency signal corresponds to a frequency band higher than the pre-set second frequency. The first frequency and the second frequency may be, but is not necessarily, set to be the same value.

The low frequency signal decoder 905 decodes the low frequency signal using a pre-set decoding method. The low frequency signal decoder 905 can perform the decoding by using any disclosed decoding method. That is, since the decoding apparatus according to the current embodiment is characterized by the decoding of the high frequency signal, decoding the low frequency signal is not limited to a specific decoding method. Examples of the decoding method used in the low frequency signal decoder 905 are the AAC method, the method of decoding predetermined important frequency component(s) and decoding the remaining frequency components as a predetermined noise signal, and so on.

The high frequency signal decoder 910 decodes the high frequency signal using the low frequency signal and decodes important frequency component(s) in the high frequency signal. The high frequency signal decoder 910 also adjusts a high frequency signal prepared to each band in which the important frequency component(s) are included and combines the high frequency signal and the important frequency component(s). The high frequency signal decoder 910 includes a frequency component decoder 915, an energy value calculator 920, a bandwidth expansion decoder 930, a signal adjuster 940, and a signal combiner 950.

The frequency component decoder 915 decodes predetermined frequency component(s) determined as important frequency component(s) according to a pre-set criterion and encoded by the encoder.

The energy value calculator 920 calculates an energy value of each frequency component decoded by the frequency component decoder 915.

The bandwidth expansion decoder 930 decodes the high frequency signal using the low frequency signal decoded by the low frequency signal decoder 905.

The signal adjuster 940 adjusts a signal prepared to a band in which the frequency component(s) decoded by the frequency component decoder 915 are included from among the signal decoded by the bandwidth expansion decoder 930.

The signal adjuster 940 adjusts the signal decoded by the bandwidth expansion decoder 930 so that an energy value of a signal of a band that is to be adjusted becomes a value obtained by subtracting an energy value of a frequency component included in each band, which is calculated by the energy value calculator 920, from an energy value of the signal decoded by the bandwidth expansion decoder 930.

The signal combiner 950 combines the frequency component(s) decoded by the frequency component decoder 915 and the signal adjusted by the signal adjuster 940.

The band combiner 955 combines the low frequency signal decoded by the low frequency signal decoder 905 and the high frequency signal combined by the signal combiner 950 and outputs the combined signal via an output terminal OUT.

Figure 10:
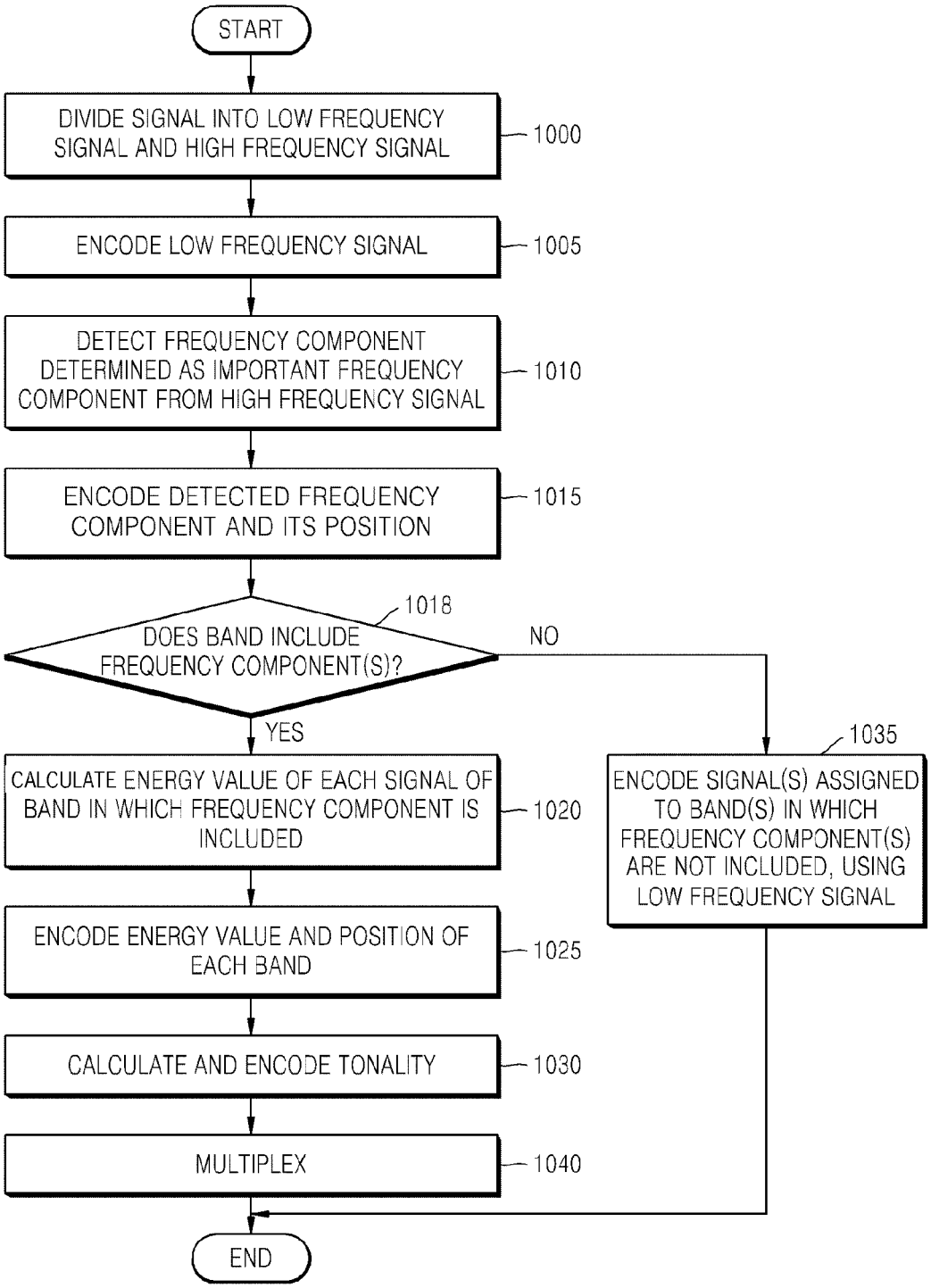
FIG. 10 is a flowchart of an encoding method according to an embodiment of the present invention.

FIG. 10 is a flowchart of an encoding method according to an embodiment of the present invention.

Referring to FIG. 10, an input signal is divided into a low frequency signal and a high frequency signal based on a pre-set frequency in operation 1000. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal divided in operation 1000 is encoded using a pre-set encoding method in operation 1005. The encoding in operation 1005 can be performed by using any disclosed encoding method. That is, since the encoding method according to the current embodiment is characterized by the encoding of the high frequency signal, encoding the low frequency signal is not limited to a specific encoding method. Examples of the encoding method used in operation 1005 are the AAC method, the method of detecting and encoding only important frequency component(s) from an input signal and encoding the remaining frequency components as a predetermined noise signal, and so on.

In operation 1010, frequency component(s) determined as important frequency component(s) according to a pre-set criterion are detected from the high frequency signal divided in operation 1000. Methods used in operation 1010 to determine an important frequency component will now be described. As a first method, an SMR value is calculated, and a signal component greater than a masking threshold is selected as an important frequency component. As a second method, an important frequency component is selected by extracting a spectral peak considering a predetermined weight. As a third method, an SNR value is calculated for each sub-band, and a frequency component having a peak value greater than a predetermined value in each sub-band having a low SNR value is selected as an important frequency component. The three methods described above can be separately embodied or can be embodied by combining at least one of them. In addition, these three methods are only illustrations, and the present invention is not limited thereto.

The frequency component(s) detected in operation 1010 and information indicating position(s) at which the frequency component(s) are encoded in operation 1015.

It is determined in operation 1018 whether a band includes the frequency component(s) selected in operation 1010. The band is a processing unit applied to perform encoding in operation 1035 that is to be described later. For example, in the case of a QMF, a band can be a sub-band or a scale factor band.

If it is determined in operation 1018 that a band includes the frequency component(s) selected in operation 1010, an energy value of each signal to reconstruct the band in which the frequency component(s) detected in operation 1010 are included is calculated in operation 1020.

An energy value of each band, which is calculated in operation 1020, and information indicating a position of each band are encoded in operation 1025.

Each tonality of high frequency signal(s) prepared to the band in which the frequency component(s) detected in operation 1010 are included is calculated and encoded in operation 1030. However, in the current embodiment, operation 1030 does not have to be necessarily included. That is, when a decoder (not shown) generates a signal that reconstructs band(s) in which frequency component(s) are included, if the decoder generates a single signal using a plurality of signals instead of using a single signal, operation 1030 may be necessary. For example, when the decoder generates signal(s) that are to reconstruct band(s) in which frequency component(s) are included using both an arbitrarily generated signal and a patched signal, operation 1030 is necessary.

If it is determined in operation 1018 that a band does not include the frequency component(s) selected in operation 1010, signal(s) prepared to band(s) in which the frequency component(s) detected in operation 1010 are not included are encoded using the low frequency signal in operation 1035. When a signal is encoded in operation 1010, information for decoding the high frequency signal using the low frequency signal is generated and encoded.

The result of the encoding performed in operation 1005, the frequency component(s) and the information indicating position(s) at which the frequency component(s) are prepared, which are encoded in operation 1015, the energy value of each band and the information indicating a position of each band, which are encoded in operation 1025, and the information for decoding the high frequency signal using the low frequency signal, which is encoded in operation 1035 are multiplexed in operation 1040. In some cases, the tonality(-ies) encoded in operation 1030 can be multiplied together in operation 1040.

Figure 11:
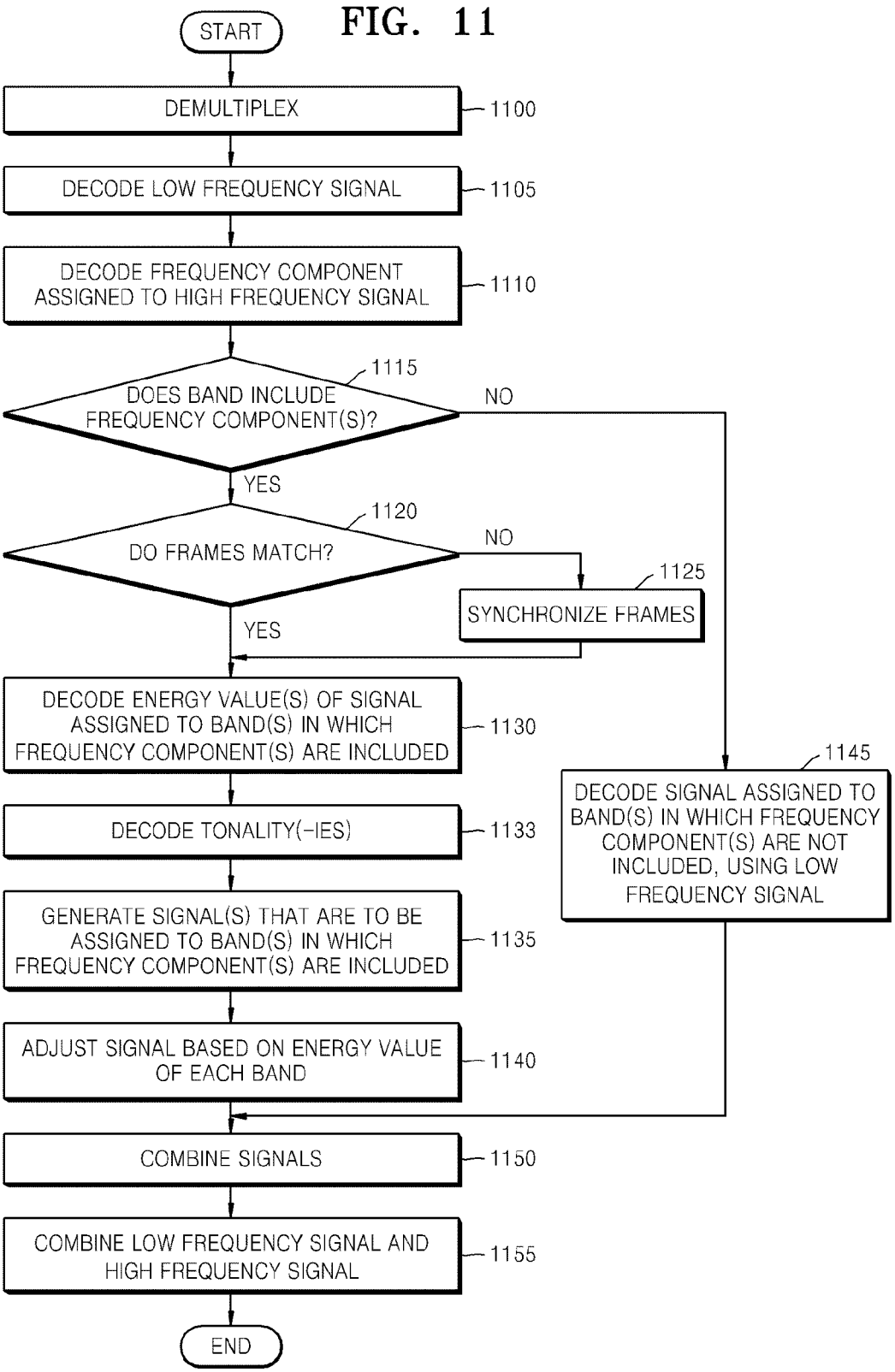
FIG. 11 is a flowchart of a decoding method according to an embodiment of the present invention.

FIG. 11 is a flowchart of a decoding method according to an embodiment of the present invention.

Referring to FIG. 11, a bitstream is received from an encoder (not shown) and demultiplexed in operation 1100. For example, frequency component(s) and information indicating position(s) at which the frequency component(s) are prepared, an energy value of each band, and a position of each band in which an energy value is encoded by the encoder, information for decoding a high frequency signal using a low frequency signal, and tonality(-ies) can be demultiplexed. The low frequency signal corresponds to a frequency band lower than the pre-set first frequency, and the high frequency signal corresponds to a frequency band higher than the pre-set second frequency. The first frequency and the second frequency may be, but is not necessarily, set to be the same value.

The low frequency signal is decoded using a pre-set decoding method in operation 1105. The decoding in operation 1105 can be performed by using any disclosed decoding method. That is, since the decoding method according to the current embodiment is characterized by the decoding of the high frequency signal, decoding the low frequency signal is not limited to a specific decoding method. Examples of the decoding method used in operation 1105 are the AAC method, a method of decoding predetermined important frequency component(s) and decoding the remaining frequency components as a predetermined noise signal, and so on.

Predetermined frequency component(s) determined as important frequency component(s) according to a pre-set criterion and encoded by the encoder are decoded in operation 1110.

It is determined in operation 1115 whether a band includes the frequency component(s) decoded in operation 1110.

If it is determined in operation 1115 that a band includes the frequency component(s), it is determined in operation 1120 whether a frame applied to the frequency component(s) decoded in operation 1110 matches a frame applied to information for decoding the high frequency signal using the low frequency signal.

If it is determined in operation 1120 that the two frames do not match each other, the frame applied to the frequency component(s) decoded in operation 1110 is synchronized with the frame applied to the information for decoding the high frequency signal using the low frequency signal in operation 1125. In operation 1125, a portion of or an entire frame applied to the information for decoding the high frequency signal using the low frequency signal may be processed based on the frame applied to the frequency component(s) decoded in operation 1110.

Energy value(s) of a signal prepared to band(s) in which the frequency component(s) decoded in operation 1110 are included are decoded in operation 1130.

Tonality(-ies) of signal(s) prepared to the band(s) in which the frequency component(s) decoded in operation 1115 are included are decoded in operation 1133. However, in the current embodiment, operation 1133 does not have to be necessarily included. That is, when a single signal is generated using a plurality of signals instead of using a single signal in operation 1135, operation 1133 may be necessary. For example, when signal(s) that are to reconstruct the band(s) in which the frequency component(s) decoded in operation 1110 are included are generated using both an arbitrarily generated signal and a patched signal, operation 1133 is necessary.

The signal(s) that are to be prepared to the band(s) in which the frequency component(s) decoded in operation 1110 are included are generated in operation 1135. Examples of a method used in operation 1135 to generate a signal will now be described. As a first method, an arbitrary high frequency signal, e.g. a random noise signal, is generated in operation 1135. As a second method, in operation 1135, a high frequency signal can be generated by copying, e.g. patching or folding, the low frequency signal decoded in operation 1105. As a third method, a high frequency signal can be generated using a low frequency signal in operation 1135.

In operation 1140, the signal generated in operation 1135 is adjusted so that energy of the signal generated in operation 1135 is adjusted considering energy value(s) of the frequency component(s) decoded in operation 1110 based on an energy value of each band, which is decoded in operation 1130. Operation 1140 has been described in more detail with reference to FIG. 3.

If operation 1133 is included in the current embodiment, in operation 1140, the signal generated in operation 1135 is adjusted by further considering the tonality(-ies) decoded in operation 1133.

If it is determined in operation 1115 that a band does not include the frequency component(s), in operation 1145, a signal to reconstruct band(s) in which the frequency component(s) decoded in operation 1110 are not included from among the high frequency signal is decoded using the low frequency signal decoded in operation 1105.

The frequency component(s) decoded in operation 1110 and the signal adjusted in operation 1140 are combined in operation 1150. Since the signal combined in operation 1150 reconstructs only the band(s) in which the frequency component(s) decoded in operation 1110 are included, the signal decoded in operation 1145 is further combined with the remaining band(s) in operation 1150. As described above, a high frequency signal is finally generated by combining the signals in operation 1150.

The low frequency signal decoded in operation 1105 and the high frequency signal combined in operation 1150 are combined in operation 1155.

Figure 12:
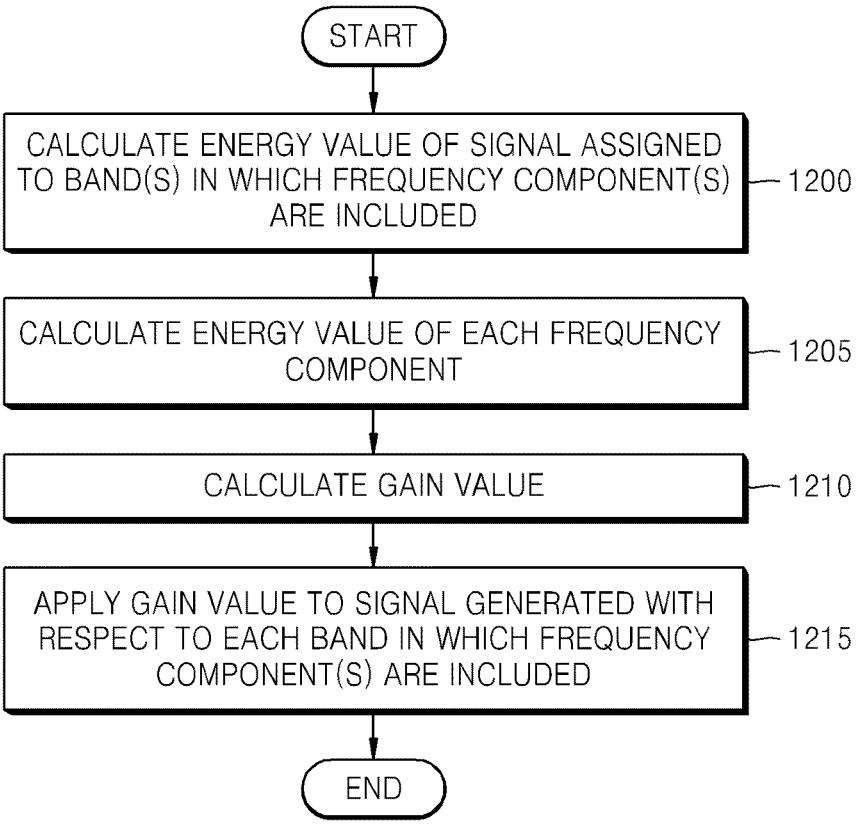
FIG. 12 is a flowchart of a process of adjusting a signal based on an energy value of each band, which is included in the decoding method illustrated in FIG. 11, according to an embodiment of the present invention.

FIG. 12 is a flowchart of operation 1140, which is included in the decoding method illustrated in FIG. 11, according to an embodiment of the present invention.

Referring to FIG. 12, an energy value of a signal prepared to each band is calculated in operation 1200 by receiving the signal(s) generated in operation 1135 with respect to the band(s) in which the frequency component(s) are included.

An energy value of each frequency component is calculated in operation 1205 by receiving the frequency component(s) decoded in operation 1110.

A gain value of the energy value(s) of the band(s) in which the frequency component(s) decoded in operation 1130 are included is calculated in operation 1210 so that each energy value calculated in operation 1200 becomes a value obtained by subtracting each energy value calculated in operation 1205 from each energy value received in operation 1130. For example, the gain value can be calculated in operation 1210 using Equation 1 above.

If the gain value is calculated considering the tonality in operation 1210, the energy value(s) of the band(s) in which the frequency component(s) are included are received in operation 1205, the tonality(-ies) of the signal(s) prepared to the band(s) in which the frequency component(s) are included are also received in operation 1205, and gain value(s) are calculated in operation 1210 by using each received energy value, each received tonality, and each energy value calculated in operation 1205.

In operation 1215, the gain value for each band, which is calculated in operation 1210, is applied to a signal generated in operation 1135 with respect to each band in which the frequency component(s) are included.

Figure 13:
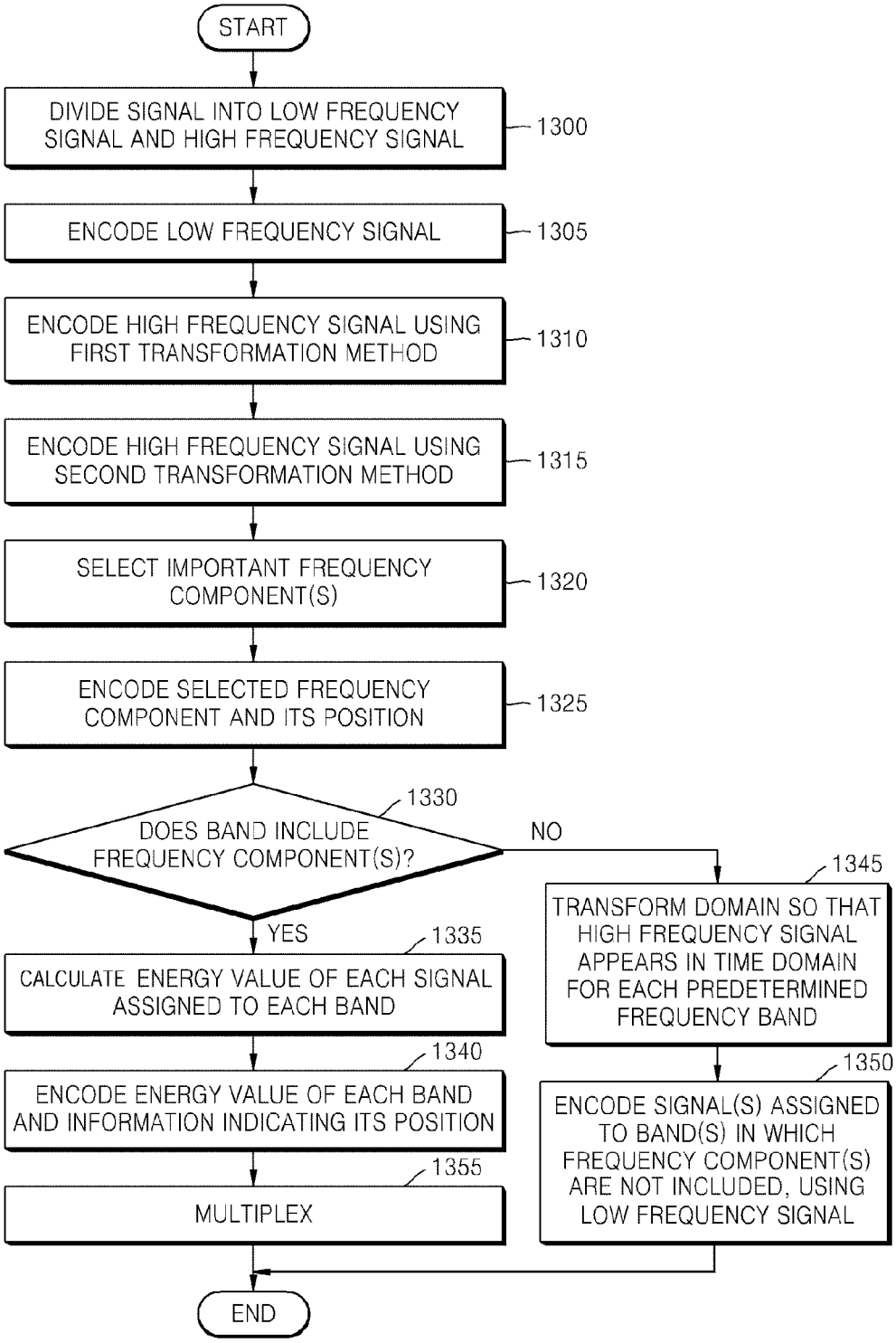
FIG. 13 is a flowchart of an encoding method according to another embodiment of the present invention.

FIG. 13 is a flowchart of an encoding method according to another embodiment of the present invention.

Referring to FIG. 13, an input signal is divided into a low frequency signal and a high frequency signal based on a pre-set frequency in operation 1300. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal divided in operation 1300 is encoded using a pre-set encoding method in operation 1305. The encoding in operation 1305 can be performed by using any disclosed encoding method. That is, since the encoding method according to the current embodiment is characterized by the encoding of the high frequency signal, encoding the low frequency signal is not limited to a specific encoding method. Examples of the encoding method used in operation 1305 are the AAC method, the method of detecting and encoding only important frequency component(s) from an input signal and encoding the remaining frequency components as a predetermined noise signal, and so on.

The high frequency signal divided in operation 1300 is transformed from the time domain to the frequency domain using a first transformation method in operation 1310.

The high frequency signal divided in operation 1300 is also transformed from the time domain to the frequency domain using a second transformation method, which is different from the first transformation method, in order to apply a psychoacoustic model in operation 1315.

The signal transformed in operation 1310 is used to encode the high frequency signal, and the signal transformed in operation 1315 is used to select an important frequency component by applying the psychoacoustic model to the high frequency signal. The psychoacoustic model is a mathematical model of a masking operation of a human auditory system.

For example, in operation 1310, the high frequency signal can be expressed as a real number part by transforming the high frequency signal in the time domain to a signal in the frequency domain using the MDCT method corresponding to the first transformation method, and in operation 1315, the high frequency signal can be expressed as an imaginary number part by transforming the high frequency signal in the time domain to a signal in the frequency domain using the MDST method corresponding to the second transformation method. The signal transformed by the MDCT method and expressed as the imaginary number part is used to encode the high frequency signal, and the signal transformed by the MDST method and expressed as the real number part is used to select an important frequency component by applying the psychoacoustic model to the high frequency signal. Since signal phase information can be additionally expressed using the transformation, a mismatch occurring by performing DFT (Discrete Fourier Transform) on a signal corresponding to the time domain and quantizing an MDCT coefficient can be solved.

In operation 1320, frequency component(s) determined as important frequency component(s) are selected using the signal transformed in operation 1315 according to a criterion pre-set from the signal transformed in operation 1310. Methods used in operation 1320 to determine an important frequency component will now be described. As a first method, an SMR value is calculated, and a signal component greater than a masking threshold is selected as an important frequency component. As a second method, an important frequency component is selected by extracting a spectral peak considering a predetermined weight. As a third method, an SNR value is calculated for each sub-band, and a frequency component having a peak value greater than a predetermined value in each sub-band having a low SNR value is selected as an important frequency component. The three methods described above can be separately embodied or can be embodied by combining at least one of them. In addition, these three methods are only illustrations, and the present invention is not limited thereto.

The frequency component(s) of a signal transformed in operation 1310, which are selected in operation 1320, and information indicating position(s) at which the frequency component(s) are to be reconstructed are encoded in operation 1325.

It is determined in operation 1330 whether a band includes the frequency component(s) selected in operation 1320. The band is a processing unit applied to perform encoding in operation 1350 that is to be described later. For example, in the case of a QMF, a band can be a sub-band or a scale factor band.

If it is determined in operation 1330 that a band includes the frequency component(s) selected in operation 1320, an energy value of each signal prepared to the band in which the frequency component(s) selected in operation 1320 are included is calculated in operation 1335.

An energy value of each band, which is calculated in operation 1335, and information indicating a position of each band are encoded in operation 1340.

If it is determined in operation 1330 that a band does not include the frequency component(s) selected in operation 1320, transforming between domains is performed in operation 1345 so that the high frequency signal divided in operation 1300 appears in the time domain for each predetermined frequency band using an analysis filterbank. For example, the transforming between domains is performed in operation 1345 by applying the QMF.

The high frequency signal(s) to reconstruct band(s) in which the frequency component(s) selected in operation 1320 are not included are encoded using the low frequency signal in operation 1350. When a signal is encoded in operation 1350, information for decoding the high frequency signal using the low frequency signal is generated and encoded.

The result of the encoding performed in operation 1305, the frequency component(s) and the information indicating position(s) at which the frequency component(s) are prepared, which are encoded in operation 1325, the energy value of each band and the information indicating a position of each band, which are encoded in operation 1340, and the information for decoding the high frequency signal using the low frequency signal, which is encoded in operation 1350 are multiplexed to a bitstream in operation 1355.

Figure 14:
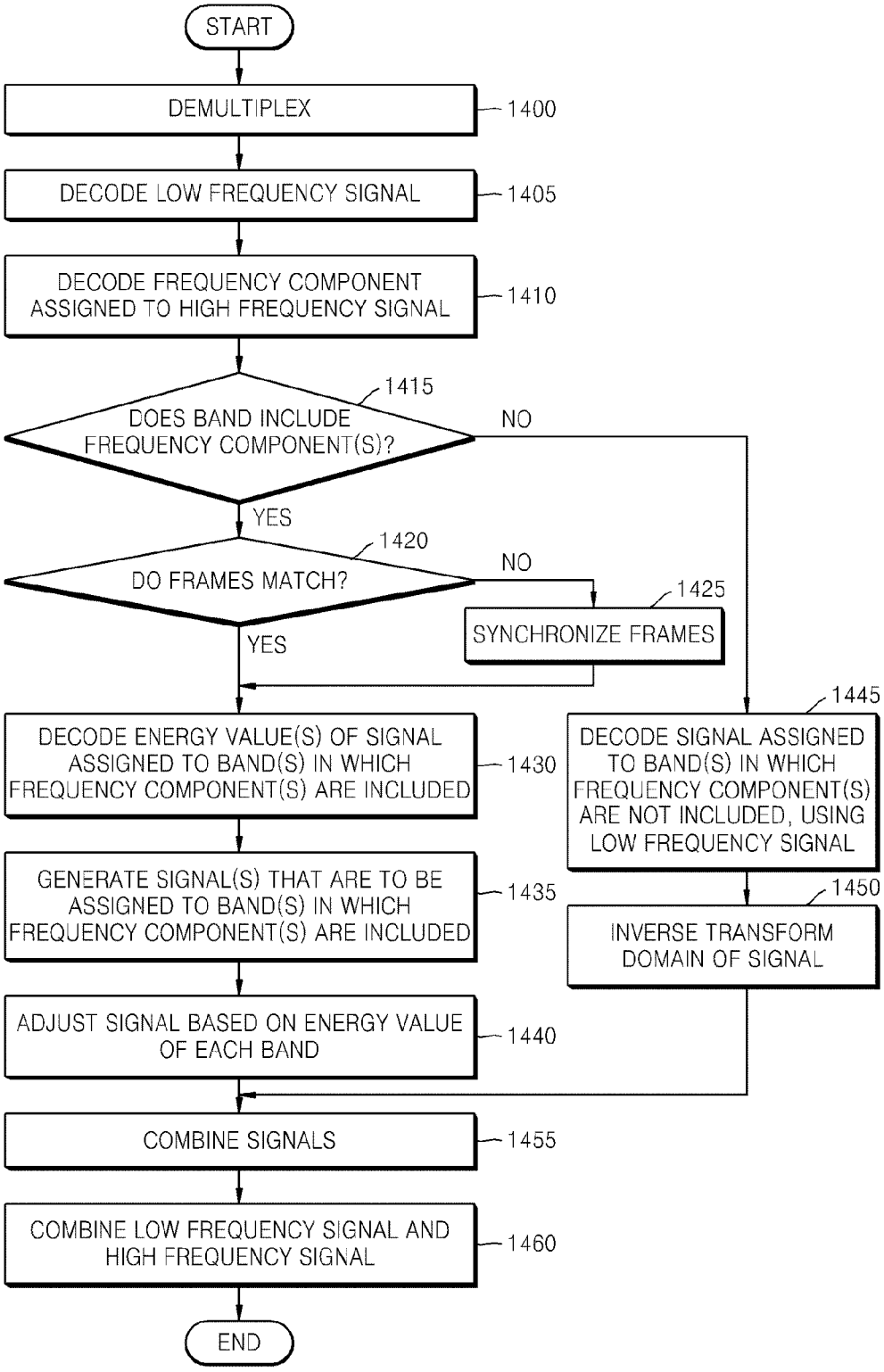
FIG. 14 is a flowchart of a decoding method according to another embodiment of the present invention.

FIG. 14 is a flowchart of a decoding method according to another embodiment of the present invention.

Referring to FIG. 14, a bitstream is received from an encoder (not shown) and demultiplexed in operation 1400. For example, frequency component(s) and information indicating position(s) at which the frequency component(s) are to be reconstructed, an energy value of each band, and a position of each band in which an energy value is encoded by the encoder, and information for decoding a high frequency signal using a low frequency signal can be demultiplexed in operation 1400. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal is decoded using a pre-set decoding method in operation 1405. The decoding in operation 1405 can be performed by using any disclosed decoding method. That is, since the decoding method according to the current embodiment is characterized by the decoding of the high frequency signal, decoding the low frequency signal is not limited to a specific decoding method. Examples of the decoding method used in operation 1405 are the AAC method, a method of decoding predetermined important frequency component(s) and decoding the remaining frequency components as a predetermined noise signal, and so on.

Predetermined frequency component(s) determined as important frequency component(s) according to a pre-set criterion and encoded by the encoder are decoded in operation 1410.

It is determined in operation 1415 whether a band includes the frequency component(s) decoded in operation 1410.

If it is determined in operation 1415 that a band includes the frequency component(s), it is determined in operation 1420 whether a frame applied to the frequency component(s) decoded in operation 1410 matches a frame applied to information for decoding the high frequency signal using the low frequency signal.

If it is determined in operation 1420 that the two frames do not match each other, in operation 1425, the frame applied to operation 1410 is synchronized with a frame applied to operation 1445 that is to be described later. In operation 1425, a portion or an entire portion of the frame applied to operation 1445 may be processed based on the frame applied to operation 1410.

Energy value(s) of a signal to reconstruct band(s) in which the frequency component(s) decoded in operation 1410 are included are decoded in operation 1430.

Signal(s) that to reconstruct the band(s) in which the frequency component(s) decoded in operation 1410 are included are generated in operation 1435.

Examples of a method used in operation 1435 to generate a signal will now be described. As a first method, an arbitrary high frequency signal, e.g. a random noise signal, is generated in operation 1435. As a second method, in operation 1435, a high frequency signal can be generated by copying, e.g. patching or folding, the low frequency signal decoded in operation 1405. As a third method, a high frequency signal can be generated using a low frequency signal in operation 1435.

In operation 1440, the signal generated in operation 1435 is adjusted so that energy of the signal generated in operation 1435 is adjusted considering energy value(s) of the frequency component(s) decoded in operation 1410 based on an energy value of each band, which is decoded in operation 1430. Operation 1440 has been described in more detail with reference to FIG. 3.

If it is determined in operation 1415 that a band does not include the frequency component(s), in operation 1445, a signal to reconstruct band(s) in which the frequency component(s) decoded in operation 1410 are not included from among the high frequency signal is decoded using the low frequency signal decoded in operation 1405.

As an inverse process of the transformation performed in operation 1345 illustrated in FIG. 13, a domain of the signal decoded in operation 1445 is inversely transformed using a synthesis filterbank in operation 1450.

The frequency component(s) decoded in operation 1410 and the signal adjusted in operation 1440 are combined in operation 1455. Since the signal combined in operation 1455 only reconstructs the band(s) in which the frequency component(s) decoded in operation 1410 are included, the signal decoded in operation 1445 and inversely transformed in operation 1450 is further combined for the remaining band(s) in operation 1455. As described above, a high frequency signal is finally generated by combining the signals in operation 1455.

The low frequency signal decoded in operation 1405 and the high frequency signal combined in operation 1455 are combined in operation 1460.

Figure 15:
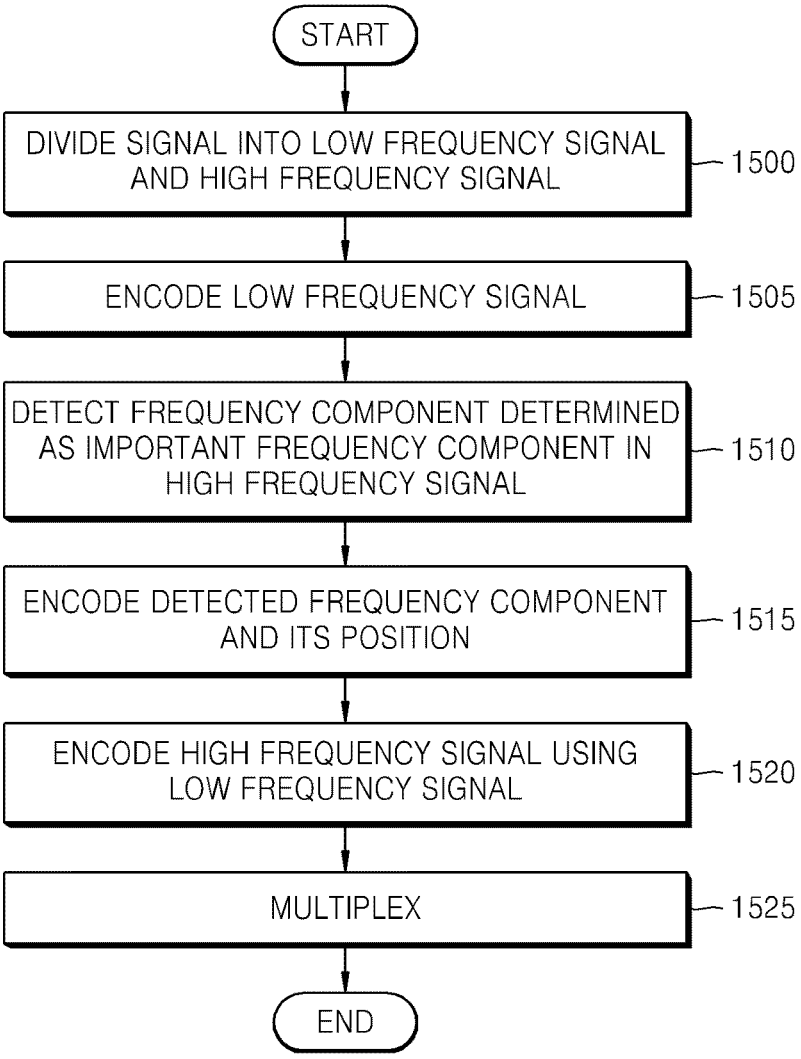
FIG. 15 is a flowchart of an encoding method according to another embodiment of the present invention.

FIG. 15 is a flowchart of an encoding method according to another embodiment of the present invention.

Referring to FIG. 15, an input signal is divided into a low frequency signal and a high frequency signal based on a pre-set frequency in operation 1500. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal divided in operation 1500 is encoded using a pre-set encoding method in operation 1505. The encoding in operation 1505 can be performed by using any disclosed encoding method. That is, since the encoding method according to the current embodiment is characterized by the encoding of the high frequency signal, encoding the low frequency signal is not limited to a specific encoding method. Examples of the encoding method used in operation 1505 are the AAC method, the method of detecting and encoding only important frequency component(s) from an input signal and encoding the remaining frequency components as a predetermined noise signal, and so on.

In operation 1510, frequency component(s) determined as important frequency component(s) according to a pre-set criterion are detected from the high frequency signal divided in operation 1500. Methods used in operation 1510 to determine an important frequency component will now be described. As a first method, an SMR value is calculated, and a signal component greater than a masking threshold is selected as an important frequency component. As a second method, an important frequency component is selected by extracting a spectral peak considering a predetermined weight. As a third method, an SNR value is calculated for each sub-band, and a frequency component having a peak value greater than a predetermined value in each sub-band having a low SNR value is selected as an important frequency component. The three methods described above can be separately embodied or can be embodied by combining one with another. In addition, these three methods are only illustrations, and the present invention is not limited thereto.

The frequency component(s) detected in operation 1510 and information indicating position(s) at which the frequency component(s) are prepared are encoded in operation 1515.

The high frequency signal is encoded using the low frequency signal in operation 1520. When the signal is encoded in operation 1520, information for decoding the high frequency signal using the low frequency signal is generated and encoded.

Unlike operation 1035 illustrated in FIG. 10 or operation 1350 illustrated in FIG. 13 in which the high frequency signal is divided into bands and only band(s) in which an important frequency component is not included are encoded, all of the high frequency signal is encoded using the low frequency signal in operation 1520.

The result of the encoding performed in operation 1505, the frequency component(s) and the information indicating position(s) at which the frequency component(s) are to be reconstructed, which are encoded in operation 1515, and the information for decoding the high frequency signal using the low frequency signal, which is encoded in operation 1520, are multiplexed to a bitstream in operation 1525.

Figure 16:
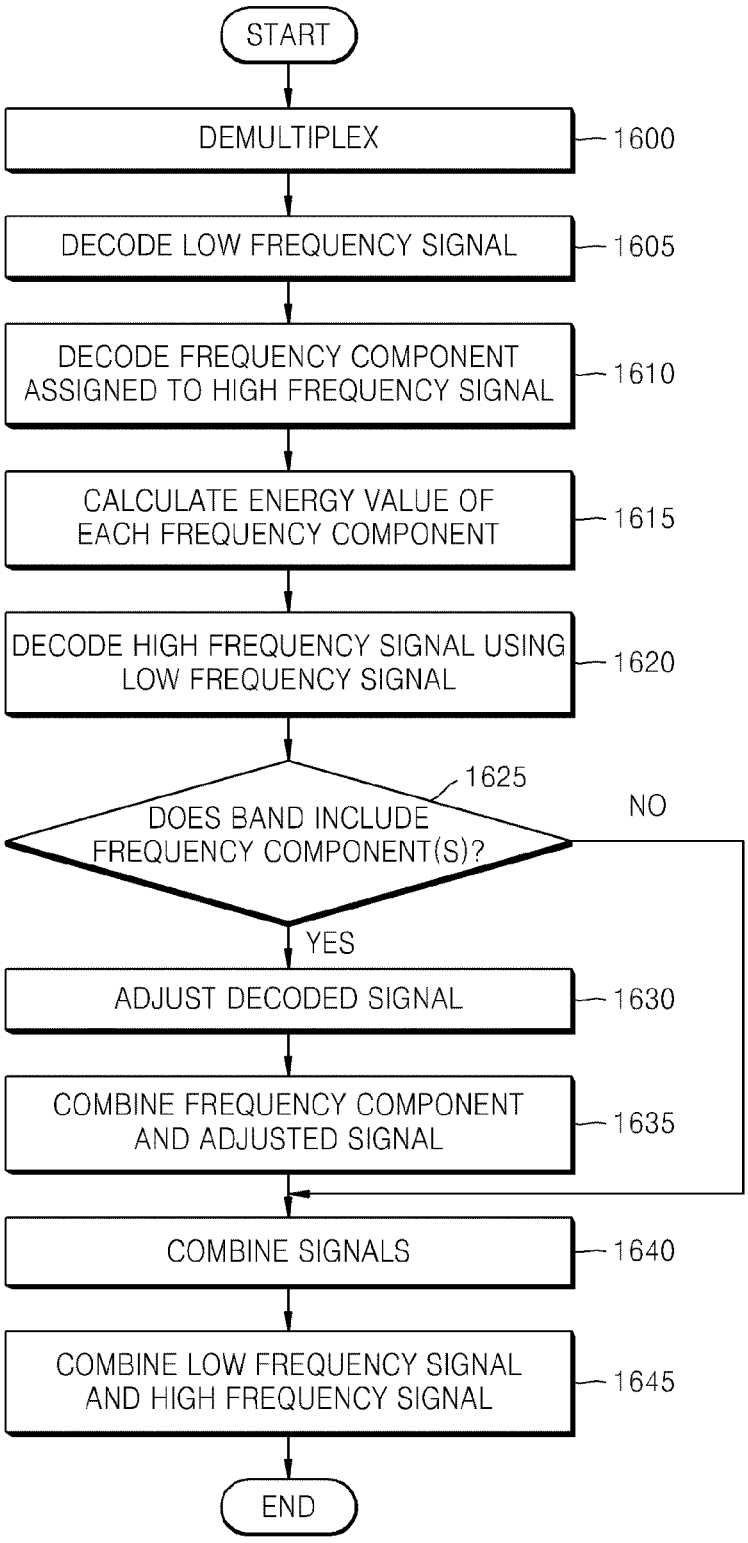
FIG. 16 is a flowchart of a decoding method according to another embodiment of the present invention.

FIG. 16 is a flowchart of a decoding method according to another embodiment of the present invention.

Referring to FIG. 16, a bitstream is received from an encoder (not shown) and demultiplexed in operation 1600. For example, frequency component(s), information indicating position(s) at which the frequency component(s) are prepared, and information for decoding a high frequency signal using a low frequency signal can be demultiplexed in operation 1600. The low frequency signal corresponds to a frequency band lower than the pre-set first frequency, and the high frequency signal corresponds to a frequency band higher than the pre-set second frequency. The first frequency and the second frequency may be, but are not necessarily, set to be the same value.

The low frequency signal is decoded using a pre-set decoding method in operation 1605. The decoding in operation 1605 can be performed by using any disclosed decoding method. That is, since the decoding method according to the current embodiment is characterized by the decoding of the high frequency signal, decoding the low frequency signal is not limited to a specific decoding method. Examples of the decoding method used in operation 1605 are the AAC method, a method of decoding predetermined important frequency component(s) and decoding the remaining frequency components as a predetermined noise signal, and so on.

Predetermined frequency component(s) determined as important frequency component(s) according to a pre-set criterion and encoded by the encoder are decoded in operation 1610.

An energy value of each frequency component decoded in operation 1610 is calculated in operation 1615.

The high frequency signal is decoded in operation 1620 using the low frequency signal decoded in operation 1605.

It is determined in operation 1625 whether a band includes the frequency component(s) decoded in operation 1620. The band is a processing unit applied to perform the encoding in operation 1620. For example, in the case of a QMF, a band can be a sub-band or a scale factor band.

If it is determined in operation 1625 that a band includes the frequency component(s), a signal to reconstruct a band in which the frequency component(s) decoded in operation 1610 are included from among the signal decoded in operation 1620 is adjusted in operation 1630.

The signal decoded in operation 1620 is adjusted in operation 1635 so that an energy value of a signal of a band adjusted in operation 1630 becomes a value obtained by subtracting an energy value of a frequency component included in each band, which is calculated in operation 1615, from an energy value of the signal decoded in operation 1620.

The frequency component(s) decoded in operation 1610 and the high frequency signal adjusted in operation 1630 are combined in operation 1640.

As described above, the signal combined in operation 1640 reconstructs the band(s) in which the frequency component(s) are included, and the high frequency signal decoded using the low frequency signal in operation 1620 reconstructs the band(s) in which the frequency component(s) are not included.

The low frequency signal decoded in operation 1605 and the high frequency signal combined in operation 1650 are combined in operation 1645.

The invention can also be embodied as computer (including all devices having an information processing function) readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

As described above, according to the present invention, important frequency component(s) are detected from a signal corresponding to a frequency band higher than a pre-set frequency and encoded, and energy value(s) of a signal to reconstruct band(s) in which the detected frequency component(s) are included are encoded. In addition, a signal to reconstruct a band in which important frequency component(s) are included is adjusted considering an energy value of the important frequency component(s) and decoded.

Accordingly, even though encoding or decoding is performed using a small number of bits, there is no degradation in sound quality of a signal corresponding to a high frequency band, and thus coding efficiency can be maximized.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

[1. A method of encoding a high frequency band of a signal, the method comprising:

dividing the signal into a low frequency band lower than a first pre-set frequency and the high frequency band higher than a second pre-set frequency;

detecting and encoding one or more frequency components included in the high frequency band according to a pre-set criterion;

encoding one or more energy values for sub-bands of the high frequency band in which the detected one or more frequency components are included; and encoding sub-bands of the high frequency band in which the detected one or more frequency components are not included.]

[2. The method of claim 1, further comprising:

encoding one or more tonalities of sub-bands of the high frequency band in which the detected one or more frequency components are included.]

[3. A method of decoding a high frequency band of a signal in which the high frequency band of the signal includes frequencies above a pre-set frequency and a low frequency band of the signal includes frequencies below the pre-set frequency, the method comprising:

decoding one or more frequency components included in the high frequency band;

decoding one or more energy values for sub-bands of the high frequency band in which the decoded one or more frequency components are included;

generating one or more signals for the sub-bands of the high frequency band in which the decoded one or more frequency components are included;

adjusting an energy value of the generated one or more signals according to one or more energy values of the decoded one or more frequency components and the decoded one or more energy values corresponding to sub-bands of the high frequency band in which the decoded one or more frequency components are included;

combining the decoded one or more frequency components and the one or more energy value-adjusted signals; and generating random noises, for sub-bands of the high frequency band in which the decoded one or more frequency components are not included.]

[4. The method of claim 3, wherein the one or more generated signals are one or more arbitrarily generated signals.]

[5. The method of claim 3, wherein the one or more generated signals are generated by copying a signal corresponding to the low frequency band of the signal.]

[6. The method of claim 3, wherein the one or more generated signals are generated by using the low frequency band of the signal.]

[7. The method of claim 3, wherein the adjusting comprises adjusting the energy value of the generated one or more signals so that the energy value of the generated one or more signals becomes a value obtained by subtracting the one or more energy values of the decoded one or more frequency components from the decoded one or more energy values corresponding to sub-bands of the high frequency band in which the decoded one or more frequency components are included.]

[8. The method of claim 3, further comprising:

decoding one or more tonalities of sub-bands of the high frequency band in which the decoded one or more frequency components are included.]

[9. The method of claim 8, wherein the adjusting comprises adjusting the energy value of the generated one or more signals using the one or more energy values of the decoded one or more frequency components and the one or more decoded tonalities based on the decoded one or more energy values corresponding to sub-bands of the high frequency band in which the decoded one or more frequency components are included.]

[10. The method of claim 3, further comprising:

synchronizing frames with each other if a frame used in the decoding of the one or more frequency components does not match a frame used in the decoding sub-bands of the high frequency band in which the decoded one or more frequency components are not included.]

[11. A method of decoding a high frequency band of a signal in which the high frequency band of the signal includes frequencies above a pre-set frequency and a low frequency band of the signal includes frequencies below the pre-set frequency, the method comprising:

decoding one or more frequency components included in the high frequency band;

decoding a high frequency signal corresponding to the high frequency band by using the low frequency signal corresponding to the low frequency band;

adjusting an energy value of sub-bands of the decoded high frequency signal corresponding to the decoded one or more frequency components based on one or more energy values of the decoded one or more frequency components; and combining the decoded one or more frequency components and the energy value-adjusted high frequency signal.]

[12. The method of claim 11, wherein the adjusting comprises adjusting the sub-bands of the decoded high frequency signal corresponding to the decoded one or more frequency components so that the energy value of the sub-bands of the decoded high frequency signal corresponding to the one or more frequency components becomes a value obtained by subtracting the one or more energy values of the decoded one or more frequency components from the energy value of the sub-bands of the decoded high frequency signal corresponding to the one or more frequency components.]

[13. The method of claim 11, further comprising:

synchronizing frames with each other if a frame used in the decoding of the one or more frequency components does not match a frame used in the decoding of the high frequency signal.]

[14. A non-transitory computer readable recording medium storing a computer readable program for executing, by a processor, a method of decoding a high frequency band of a signal in which the high frequency band of the signal includes frequencies above a pre-set frequency and a low frequency band of the signal includes frequencies below the pre-set frequency, the method comprising:

decoding one or more frequency components included in the high frequency band;

decoding one or more energy values corresponding to sub-bands of the high frequency band in which the decoded one or more frequency components are included;

generating one or more signals corresponding to the sub-bands of the high frequency band in which the decoded one or more frequency components are;

adjusting an energy value of the generated one or more signals according to one or more energy values of the decoded one or more frequency components and the decoded one or more energy values corresponding to sub-bands of the high frequency band in which the decoded one or more frequency components are included;

combining the decoded one or more frequency components and the one or more energy value-adjusted signals; and generating random noises, for sub-bands of the high frequency band in which the decoded one or more frequency components are not included.]

[15. An apparatus for decoding a high frequency band of a signal in which the high frequency band of the signal includes frequencies above a pre-set frequency and a low frequency band of the signal includes frequencies below the pre-set frequency, the apparatus comprising:

a frequency component decoder to decode one or more frequency components included in the high frequency band;

an energy value decoder to decode one or more energy values corresponding to sub-bands of the high frequency band in which the decoded one or more frequency components are included;

a signal generator to generate one or more signals corresponding for the sub-bands of the high frequency band in which the decoded one or more frequency components are included;

a signal adjuster to adjust one or more energy values of the generated one or more signals according to one or more energy values of the decoded one or more frequency components and the decoded one or more energy values corresponding to sub-bands of the high frequency band in which the decoded one or more frequency components are included;

a signal combiner to combine the decoded one or more frequency components and the one or more energy value-adjusted signals; and a bandwidth extension decoder to generate random noises, for sub-bands of the high frequency band in which the decoded one or more frequency components are not included.]

[16. The apparatus of claim 15, wherein the one or more generated signals are an arbitrarily generated signals.]

[17. The apparatus of claim 15, wherein the signal generator generates a signal obtained by copying a signal corresponding to a frequency band lower than the pre-set frequency.]

[18. The apparatus of claim 15, wherein the one or more generated signals are generated by using the low frequency band of the signal.]

[19. The apparatus of claim 15, wherein the signal adjuster adjusts the energy value of the generated one or more signals so that the energy value of the generated one or more signals becomes a value obtained by subtracting the one or more energy values of the decoded one or more frequency components from the decoded one or more energy values corresponding to sub-bands of the high frequency band in which the decoded one or more frequency components are included.]

[20. The apparatus of claim 15, further comprising:

a tonality decoder to decode one or more tonalities of sub-bands of the high frequency band in which the decoded one or more frequency components are included.]

[21. The apparatus of claim 20, wherein the signal adjuster adjusts the energy value of the generated one or more signals using the one or more energy values of the decoded one or more frequency components and the decoded one or more tonalities based on the decoded one or more energy values corresponding to sub-bands of the high frequency band in which the decoded one or more frequency components are included.]

[22. The apparatus of claim 15, further comprising:

a synchronizer to synchronize frames with each other if a frame used by the frequency component decoder does not match a frame used by the bandwidth extension decoder.]

[23. A method of decoding a high frequency signal, the method comprising:

decoding one or more energy values included in a bitstream;

decoding one or more frequency components of a high frequency band included in the bitstream;

generating one or more signals by using the decoded one or more energy values, for sub-bands of the high frequency band in which the decoded one or more frequency components are included; and generating random noises, for sub-bands of the high frequency band in which the decoded one or more frequency components are not included.]

*24. A method of encoding a signal including at least one of audio and speech, the method comprising:*

*dividing the signal into a high frequency signal corresponding to a band higher than a first pre-set frequency and a low frequency signal corresponding to a band lower than a second pre-set frequency;*

*encoding the low frequency signal;*

*determining a first subband in which one or more frequency component is included and a second subband in which one or more frequency component is not included, in the band corresponding to the high frequency signal, where the band corresponding to the high frequency signal includes a plurality of subbands;*

*encoding one or more energy values of the high frequency signal for the first subband;*

*encoding the high frequency signal for the second subband in a different manner from the encoding manner for the first subband; and*

*generating a bitstream including an encoded result of the low frequency signal and an encoded result of the high frequency signal.*

* * * * *